US012756552B2

(12) United States Patent
Lopez Vega et al.

(10) Patent No.: US 12,756,552 B2
(45) Date of Patent: Oct. 6, 2026

(54) SCALABLE CRYPTOGRAPHIC KEY REGENERATION AND REDISTRIBUTION TO SECURE PUBLISH-SUBSCRIBE SYSTEMS

(71) Applicant: Real-Time Innovations, Inc., Sunnyvale, CA (US)

(72) Inventors: Jose Maria Lopez Vega, Granada (ES); Gerardo Pardo-Castellote, Santa Cruz, CA (US); Yusheng Yang, Newark, CA (US); Fernando Crespo Sanchez, San Jose, CA (US)

(73) Assignee: Real-Time Innovations, Inc., Sunnyvale, CA (US)

( * ) Notice: Subject to any disclaimer, the term of this patent is extended or adjusted under 35 U.S.C. 154(b) by 573 days.

(21) Appl. No.: 18/222,935

(22) Filed: Jul. 17, 2023

(65) Prior Publication Data

US 2024/0031148 A1 Jan. 25, 2024

Related U.S. Application Data

(60) Provisional application No. 63/390,475, filed on Jul. 19, 2022.

(51) Int. Cl.
*H04L 9/08* (2006.01)
*H04L 67/55* (2022.01)

(52) U.S. Cl.
CPC .......... *H04L 9/0891* (2013.01); *H04L 9/0861* (2013.01); *H04L 67/55* (2022.05)

(58) Field of Classification Search
CPC ...... H04L 9/0891; H04L 9/0861; H04L 67/55
See application file for complete search history.

(56) References Cited

U.S. PATENT DOCUMENTS

| | | | | |
|---|---|---|---|---|
| 2011/0296175 | A1* | 12/2011 | Shin | H04L 9/0825 380/278 |
| 2017/0155628 | A1* | 6/2017 | Rohloff | H04L 63/02 |
| 2022/0191018 | A1* | 6/2022 | Giblin | H04L 9/0861 |
| 2022/0385738 | A1* | 12/2022 | Circosta | H04L 63/101 |
| 2023/0142949 | A1* | 5/2023 | Oh | H04L 9/0822 713/171 |

* cited by examiner

*Primary Examiner* — Matthew T Henning
(74) *Attorney, Agent, or Firm* — LUMEN PATENT FIRM

(57) ABSTRACT

A method is provided for performing secure and scalable distribution of symmetric keys from a publisher to one or more subscribers in publish-subscribe system. In addition, a method is provided for performing secure and scalable distribution of cached data samples from a publisher to one or more subscribers in a publish-subscribe system.

1 Claim, 6 Drawing Sheets

SCALABLE CRYPTOGRAPHIC KEY REGENERATION AND REDISTRIBUTION TO SECURE PUBLISH-SUBSCRIBE SYSTEMS

CROSS-REFERENCE TO RELATED APPLICATIONS

This application claims priority from U.S. Provisional Patent Application 63/390,475 filed Jul. 19, 2022, which is incorporated herein by reference.

FIELD OF THE INVENTION

This invention relates to real-time publish-subscribe communication and protocols.

BACKGROUND OF THE INVENTION

Unlike point-to-point request/reply systems, where data is exchanged between pairs of endpoints, in Publish-Subscribe systems the Publisher entity may have to send data to many subscribing entities (Subscribers), which can range from a handful to hundreds, thousands, or more.

Many of these systems may be used for critical applications that require security. Security requires an authentication phase where the Publisher can securely identify Subscribers and determine they have the necessary permissions to receive the information they send. Likewise, the Subscribers need to authenticate the Publishers to ensure they are entitled to produce the information they send.

Beyond authentication, Publishers and Subscribers need to securely establish (exchange or derive) Session Keys that can be used to cryptographically protect (via encryption and/or message authentication) the actual data exchanged. The process of securely establishing Session Keys with multiple Subscribers can be quite expensive in terms of CPU and bandwidth as it would normally require sending a new secure message to each individual Subscriber.

The present invention addresses the needs in the art.

SUMMARY OF THE INVENTION

In one embodiment, the invention is a method for performing secure and scalable distribution of symmetric keys from a publisher to one or more subscribers in publish-subscribe system. The method includes having a plurality of applications, each application having a plurality of participants, each participant containing a plurality of publishers and subscribers. The method further includes having a cryptographic symmetric key for each publisher to encode data samples sent by the publisher to one or more of the subscribers, where the cryptographic symmetric key is derived from a key material and a key revision, where the key material is a piece of cryptographic information unique per publisher and where the key revision is a piece of cryptographic information unique per participant; where a participant can generate a plurality of key revisions. The unique key material for the publisher is distributed by the participant containing the publisher to the other participants. One of the key revisions is distributed by the participant containing the publisher to the other participants. A new cryptographic symmetric key for the publisher is derived from the distributed unique key material for the publisher and one of the distributed key revisions for the participant containing the publisher.

In another embodiment, the invention is a method for performing secure and scalable distribution of cached data samples from a publisher to one or more subscribers in a publish-subscribe system. The method includes having a plurality of applications, each application having a plurality of participants, each participant containing a plurality of publishers and subscribers. The method further includes having a plurality of cryptographic symmetric keys for each publisher to encode data samples sent by the publisher to one or more of the subscribers. The method further includes having a cache of samples in the publisher, where each sample is encoded with one of the plurality of cryptographic symmetric keys. The publisher stores a finite history of the most recent cryptographic symmetric keys, where a new cryptographic symmetric key removes the oldest cryptographic symmetric key from the finite history, where samples in the cache of samples encoded using an oldest cryptographic symmetric key are re-encoded using the latest cryptographic symmetric key in the cryptographic symmetric key history. The publisher sending a window of the most recent cryptographic symmetric keys in the cryptographic symmetric key history to one or more of the subscribers. The publisher sending a sample from the cache of samples to one or more the subscribers, where the publisher re-encodes a sample with the latest cryptographic symmetric key in the cryptographic symmetric key history if the cryptographic symmetric key used to encode the sample is outside the window sent to one or more subscribers.

In yet another embodiment, the method is a method for performing secure and scalable distribution of cryptographic symmetric keys and cached data samples encoded using the cryptographic symmetric keys from a publisher to one or more subscribers in a publish-subscribe system. This method is a combination of the above described methods, where a cryptographic symmetric key is derived from a key material and a key revision.

DETAILED DESCRIPTION

Figure 1:
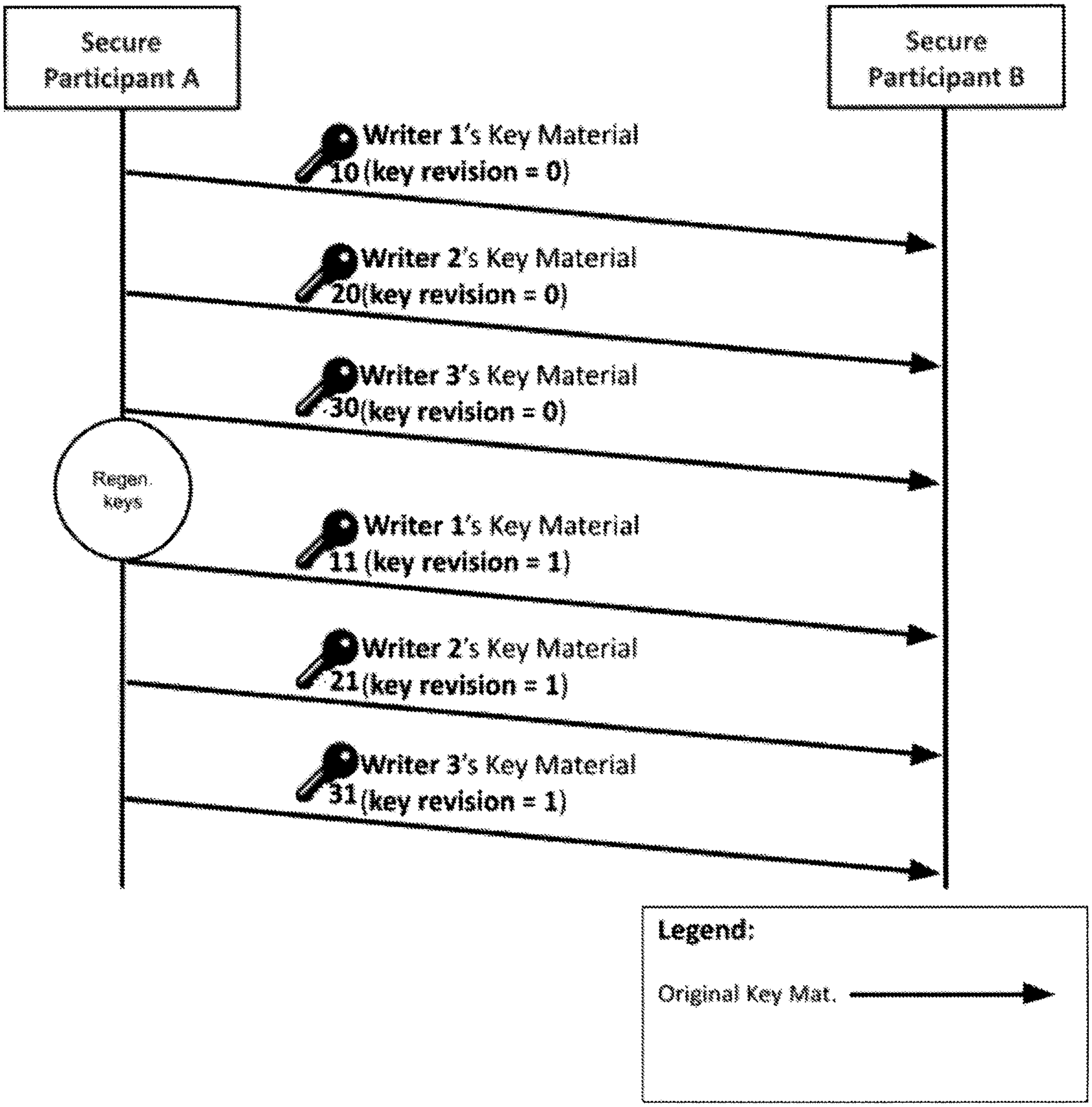
FIG. 1 shows according to an exemplary embodiment of the invention propagation of original and updated Data-Writer Key Material to derive Session Keys.

Unlike point-to-point request/reply systems, where data is exchanged between pairs of endpoints, in Publish-Subscribe systems the Publisher entity may have to send data to many subscribing entities (Subscribers), which can range from a handful to hundreds, thousands, or more.

Many of these systems may be used for critical applications that require security. Security requires an authentication phase where the Publisher can securely identify Subscribers and determine they have the necessary permissions to receive the information they send. Likewise, the Subscribers need to authenticate the Publishers to ensure they are entitled to produce the information they send.

Beyond authentication, Publishers and Subscribers need to securely establish (exchange or derive) Session Keys that can be used to cryptographically protect (via encryption and/or message authentication) the actual data exchanged. In this context, we define Key Material (KM) as a piece of cryptographic information from which an entity (Publisher or Subscriber) can derive a Session Key. We use the term (secure) encoding to refer to the process of cryptographically protecting data (converting plain data to encrypted data and/or adding a message authentication code). Likewise, we use the term (secure) decoding to refer to the process of validating the message authentication code and/or extracting the plain data from the cryptographically protected data.

For scalability in Publish-Subscribe systems, it is desirable for a Publisher to share the same cryptographic KM with multiple Subscribers. That way the data does not need to be encrypted (or protected by a message-authentication tag) multiple times and there is no need to keep track of many separate Session Keys for a single Publisher.

However, a Publisher that shares KM with multiple Subscribers may need to change the Session Keys at certain times. For example, if a Session Key has been used to encode too many messages, if the Publisher needs to revoke access permissions for one or more existing Subscribers, or if the criteria to determine who has access to the information has changed.

The process of securely establishing Session Keys with multiple Subscribers can be quite expensive in terms of CPU and bandwidth as it would normally require sending a new secure message to each individual Subscriber.

This invention provides an efficient and scalable solution for cryptographic (session) key regeneration and distribution to many Subscribers to achieve better-than-linear scaling with the number of Subscribers, providing support for scalable dynamic Publishers' and Subscribers' renewal, revocation, and expiration.

In addition, Publish-Subscribe systems are often able to "cache" previously-published data and send it to Subscribers that join the system after the data was published. This cached data is usually stored in encoded form (this is, securely encoded using the Publisher Session Key) so subsequent re-sending of previously-published data does not require spending resources in encoding the same data again. The problem with this approach is that after Session Key change, the cached data needs to be encoded again with the new Session Key.

An approach for cached data is for the Publisher to just encode all of the cached data again whenever its Session Key changes. The problem with this approach is that cached data could have thousands (or even hundreds of thousands) of individual messages, which makes the process of encoding all the data again and therefore Session Key generation very expensive.

This invention provides a scalable solution for management of the securely-protected cached messages that avoids encoding them each time the Session Key changes.

To better illustrate the concepts in this invention, the rest of this document uses Data Distribution Service (DDS) system as an example of a Publish-Subscribe System to which this invention can apply.

Acronyms and Definitions

Publish-Subscribe Definitions

DDS: The Data Distribution Service (DDS) for real-time systems is an Object Management Group (OMG) connectivity framework standard for Data-Centric Publish-Subscribe Systems.

Real-Time Publish-Subscribe (RTPS): An interoperability wire protocol for DDS systems. Defined in the OMG DDSI-RTPS specification.

DDS Entity: Abstract class that has a set of associated events known as statuses, a set of associated Quality of Service Policies (QosPolicies), and optionally a listener to receive notifications about status changes.

Publisher or Producer: An entity that sends data to one or more Subscribers or Consumers.

(DDS) DataWriter: A specialization of the DDS Entity class that publishes data to DataReaders. Matches the general use of the term "Publisher" or "Producer".

DDS Publisher: A group of DataWriters.

Subscriber or Consumer: An entity that receives data from one or more Publishers or Producers.

(DDS) DataReader: An specialization of the DDS Entity class that subscribed to data from one or more DataWriters. Matches the general use of the term "Subscriber" or "Consumer".

DDS Subscriber: A group of DataReaders.

(DDS) Participant: A group of DDS Publishers, DataWriters, DDS Subscribers, and DataReaders running under the same application and that share common resources.

Node: A component in a network that uses a Participant to publish or subscribe to data.

Sample: A data message published from a DataWriter to a (or multiple) DataReader(s).

DDS Security: The OMG DDS Security specification to communicate DDS systems securely.

DDS Security Cryptographic Plugin: A concept from the DDS Security specification, the Cryptographic plugin defines the types and operations necessary to support encryption, digest, message authentication codes, and key exchange for DDS Participants, DataWriters, and DataReaders.

DDS Security Token: A concept from the DDS Security specification, this class represents a generic holder for storing bytes that can be sent on the wire. For example, the DDS Security specification defines CryptoToken as a generic holder for key material.

Identity CA Certificate: The certificate for the Certificate Authority that identifies Participants within a system.

Identity Certificate: A certificate that chains up to the Identity CA. The Identity Certificate binds the Public Key of the Participant to a Distinguished Name (subject name) for the Participant.

Participant: A group of Publishers and Subscribers running under the same application and that share common resources.

Other Definitions

Sender: Source of data or metadata send to a destination.

Receiver: Destination of data or metadata send from a source.

(Secure) Encoding: The process of cryptographically protecting data. This includes encrypting data (transforming plaintext into ciphertext, and/or adding a message authentication code).

(Secure) Decoding: The process of cryptographically validating and/or extracting the plaintext data from the cryptographically protected ciphertext.

Symmetric Key: In cryptography, a symmetric key is one that is used both to encode and decode information. Consequently, to decode a ciphertext encoded with a given symmetric key, the same symmetric key needs to be used.

Common MAC: A Message Authentication Code that is used to authenticate a data payload sent from a sender using a symmetric key associated with the sender and shared with all of the trusted receivers.

Receiver-Specific MAC: A Message Authentication Code that is used to authenticate a data payload sent from a DDS Entity using a symmetric key associated with a specific receiver and shared only with that receiver.

Session Key: A temporary symmetric key DDS entities use for creating the ciphertext and/or the Common MAC. It is owned by a DDS Entity and shared with all of the DDS Entity's trusted matched DDS entities.

Session Receiver-Specific Keys: A temporary symmetric key DataWriters use for creating MACs bound to a specific DataReader (Receiver-Specific MAC). It is owned by a DataWriter and shared with (ideally) only one specific trusted matched DataReader.

Key Material (KM): A piece of cryptographic information from which a DDS Entity can derive a Session Key. It is assigned by the DDS Security Cryptographic plugin.

Original Key Material (OKM): The KM the Cryptographic plugin assigns to a DDS entity upon a register_local_(participant/datawriter/datareader) call, which is typically called during the DDS Entity creation.

Key Revision (KR): A piece of cryptographic information that allows deriving a new symmetric key from an existing KM.

Key Revision Token (KRT): A specialization of a DDS Security Token to encapsulate one or more KR(s), usually to send it to another DDS Entity.

Key Regeneration: The process of generating new Key Material for a DDS Entity for which we had already generated previous Key Material.

Key Redistribution: The process of distributing new Key Material for a DDS Entity for which we had already distributed previous Key Material.

Rekeying event: An event that results in the regeneration of all the symmetric keys of a given Participant and the propagation of these keys to trusted remote Participants.

Revoked Participant: A Participant whose Identity Certificate has expired or has been revoked for any reason.

Remove a Participant: Action of removing a remote Participant state from a local Participant. It has no security-specific actions associated with it.

Ignore a Participant: Action of removing a remote Participant and also adding that remote Participant to a local Participant's list of ignored Participants (Participants from which any received data will be ignored). It has no security-specific actions associated with it.

Banish a Participant: Action of ignoring a remote Participant and also securely preventing that remote Participant from receiving anything the local Participant exchanges securely.

CORE: The RTI Connext DDS Core libraries.

PLUGINS: The RTI Security Plugins libraries.

Setting the Stage of the Invention

To fully support Dynamic Certificate Renewal, Revocation, and Expiration on a DDS Security system we need the following main elements:

1. Session Key regeneration and redistribution
2. Participant Identity Certificate revocation and expiration
3. Participant Identity Certificates renewal
4. Secure historical DataWriter samples re-encoding We now briefly introduce these elements.

Session Key Regeneration and Redistribution

The way DDS Security's built-in plugins enforce access control is through the Cryptographic plugin. The Cryptographic plugin controls who has access to the system by selectively sharing the appropriate Key Material. Specifically, the way the Cryptographic plugin prevents an unauthorized Participant from accessing a DDS system is by not sharing with that Participant the sender's (Participant, DataWriter, or DataReader) information needed to derive the Session Keys used for protecting the RTPS messages, submessages, and user data.

Consequently, to effectively allow for kicking out from a DDS Security system a Participant whose certificate has expired or has been revoked (we will refer to this Participant as a Revoked Participant or non-trusted Participant), we need two things:

- A mechanism to obtain new Session Keys for every Participant that previously shared its keys with the Revoked Participant. A Participant may use a different Session Key for every DataWriter it owns.
- A mechanism to share the updated Session Keys with all of the Participants that previously had access to those keys, minus the Revoked Participant.

Other peer-to-peer Publish-Systems typically use similar mechanisms to share key material from the sender to all the receivers, whether that key material is specific to a single sender or groups of senders.

Existing mechanisms for (Session) Key distribution are inefficient because they require exchanging all of the new DataWriter Key Material: this introduces a high cost both in terms of network overhead (traffic exchanged) and CPU processing (associated with the reliable delivery of the DataWriter Key Material).

Other peer-to-peer Publish-Systems will encounter similar scalability issues whenever a sender needs to regenerate the key material that was previously shared with multiple receivers.

Participant Identity Certificate Revocation and Expiration

Typical access control mechanisms rely on first authenticating the identity of the actor that wants access to a resource, and then checking that the authenticated actor has the necessary permissions.

Publish-Subscribe systems and specifically DDS security operate the same way. The authentication and access control checks are typically performed at "discovery" or "connection" time and based on those the Key Material is exchanged with the Participants that pass those checks.

However, the access controls cannot stop after the initial access grant: In general, the fact that an actor or Participant has permissions at a point in time to do something does not grant those permissions indefinitely. There are multiple reasons for that.

- The credentials presented by a Participant in order to show its identity or permissions may have an expiration time (much like any government-issued document).
- The credentials presented by a Participant in order to show permissions may be explicitly revoked prior to their time-based expiration (similar to how a driver's license may be revoked due to a serious violation)

There may be policy changes that require changing the permissions of active participants on the system.

Because of this, it becomes necessary to be able to "rescind" or "revoke" the access of Participants that had previously been granted access and therefore already have the Key Material previously sent to them.

The (Session) Key Regeneration and Redistribution mechanism we presented in Section Session Key regeneration and redistribution provides us with the tools needed to securely remove a Participant from the system. With the mechanism to remove a Participant in place, with this in place it becomes possible to enforce Identity Certificate validity at ma y points in time, for example:

Whenever the Identity Certificate or the Permissions Document that was presented by the Participant expires.

Whenever any information is received invalidating the credentials associated with a Participant. For example, if the Identity Certificate is found in a Certificate Revocation List distributed by some means.

Participant Identity Certificates Renewal

DDS Security does not provide mechanisms to propagate changes in the Identity certificate to other Participants. This lack of mutability for the Identity Certificate forces users to perform full Participant destruction and creation to renew the Participant certificate. Of course, this is not acceptable for systems requiring high availability, as destroying and creating a Participant will result in communication loss and triggering full discovery.

Secure Historical DataWriter Samples Re-Encoding

DDS supports delivering historical samples to late joiners. DDS (through the DDS Security specification) also supports protecting the sample's content.

An efficient way (and also the one that RTI follows) of implementing sample content protection in combination with historical sample delivery is to store the samples encoded in the DataWriter sample queue, so there is no need to encode them again upon resending. While storing encoding samples works great when Session Keys remain unchanged during the whole DataWriter lifecycle, it becomes a problem when the Session Key needs to change (and therefore the samples need to be reencoded, which has a significant impact on the CPU usage).

This invention relates to a method for scalable key regeneration and redistribution for publish-subscribe systems, including those based on the data distribution service standard (DDS) and those using the Real-Time Publish-Subscribe (DDSI-RTPS) wire protocol standard.

Original Contributions

This invention is about the following main original contributions:

An efficient Key Regeneration mechanism for publish-subscribe systems.

A Scalable Key Redistribution mechanism for publish-subscribe systems.

A seamless no-communication-loss key transition

An efficient historical samples management mechanism for secure DataWriters.

Efficient Key Regeneration Mechanism for Publish-Subscribe Systems

To enforce fine-grained access control a publish-subscribe system typically needs to create and maintain different Key Material for each separately-protected Endpoints (e.g. each DataWriter or DataReader) that way sharing the KeyMaterial used for that Endpoint does not "leak" information that can be used to decode data from other DataWriters or DataReaders.

Generating Key Material can be an expensive operation in terms of CPU as it typically requires the creation of cryptographically-secure random numbers and the use of Key-Derivation Functions. If a Participant needs to re-generate the Key Material for all the Endpoints it contains the burden of generating that Key Material that can be significant.

We created an efficient key regeneration mechanism that allows generating many different Key Material that can be used for different Endpoints within the same Participant (e.g. creating new, unique, Key Material for every DataReader and DataWriter in the Participant) using an effort that is significantly less than linear with the number of Endpoints contained by the Participant.

The mechanism has sharing a Participant-level secret random NONCE that can be used in combination with the original DataWriter Key Material to derive a new set of Session Keys.

This part of the invention is further described in the following sections:

Key regeneration and redistribution: Design Decisions

Key regeneration and redistribution: General Flow (subsection Supporting Basic case of key regeneration and distribution)

Key regeneration and redistribution: New Types and SPIs (particularly section New KeyRevision Tokens ParticipantGenericMessage class)

Key regeneration and redistribution: Examples

Scalable Key Redistribution Mechanism for Publish-Subscribe Systems

We created a scalable key redistribution mechanism that allows for the trusted Participants in the system to receive the needed new (re-generated) Session Keys in a way that significantly reduces the network traffic.

Since the re-generated Session Key is derived from the original Key Material and a Participant-level random NONCE and the trusted Participants had already received the original Key Material it is sufficient to send them the new Participant-level random NONCE and they use it to derive the new Session Keys themselves.

In this sense, the number of messages to be delivered from one Participant to the rest of the trusted Participants goes from (RemoteParticipants×LocalDataWriters) to (RemoteParticipants).

This part of the invention is further described in the following sections:

Key regeneration and redistribution: Design Decisions

Key regeneration and redistribution: General Flow (subsection Supporting Basic case of key regeneration and distribution)

Key regeneration and redistribution: New Types and SPIs (particularly section New KeyRevision Tokens ParticipantGenericMessage class)

Key regeneration and redistribution: Examples

Seamless No-Communication-Loss Key Transition

We created a strategy to achieve a seamless, without loss in communication, key transition. In this sense, we leverage any underlying reliability features available from the Publish-SUbscribe infrastructure.

In the case of DDS/RTPS, we leverage DDS reliability features to achieve transitioning from a set of Session Keys to a new set without breaking the communication between the two involved Participants.

In particular, after we send new Key Revision Tokens to all of the trusted remote Participants, we take advantage of the RTPS reliability protocol to detect when all of these remote Participants have received the Key Revision Tokens we sent, and only then do we start using the new Session Keys derived from the new Key Revision information. We combine this with the definition of a timeout to avoid holding the transition for too long in case one of the remote Participants becomes unresponsive.

This part of the invention is further described in the following sections:

- Key regeneration and redistribution: Design Decisions (KR-R2)
- Key regeneration and redistribution: General Flow (subsection Supporting Basic case of key regeneration and distribution, step 4)

Efficient Historical Samples Management Mechanism for Secure DataWriters

We created a very efficient management mechanism for historical samples, which is based on the following concepts:

- Lazy re-encoding: Sample reencoding is delayed as much as possible to reduce the CPU impact. Ideally, the re-encoding is delayed until the sample needs to be sent to the wire.
  - This part of the invention is further described in the following sections:
    - Key regeneration and redistribution: Design Decisions (KR-R3)
    - Supporting Data Protection for historical data
- Key Revision Window (KRW) and Key Revision Max. History Depth (KRMHD): These two concepts allow for a relaxed lazy reencoding approach that helps users to balance bandwidth, CPU, and memory requirements.
  - This part of the invention is further described in the following sections:
    - Key regeneration and redistribution: Design Decisions (KR-R3)
    - Key revisions lifecycle
    - Implications on Integrity/Confidentiality
- Compactable Sequence Interval List for fast lookup: A mechanism to identify samples that need reencoding with O(1) algorithmic complexity and minimal memory usage requirements. This allows us to very efficiently look for samples that need to be reencoded at a given point in time.
  - This part of the invention is further described in the following sections:
    - Key regeneration and redistribution: Design Decisions (KR-R3)
    - REDASequenceNumberIntervalList Architectural Design Requirements Key Regeneration and Redistribution: Requirements KR-R1. Support generating and delivering new keys to all of the matched trusted Participants, and no one else, in a scalable way.

After generating new Session Keys, the local Participant needs to deliver them to the remote Participants he trusts, so the local Participant can keep communicating with them. The local Participant shall not distribute the new Session Keys to non-trusted Participants.

To be scalable, the granularity of the Session Key regeneration shall be at the remote Participant level: Connext Secure will not support regenerating the Session Keys for individual DataWriters or DataReaders.

KR-R2. New Keys delivery should happen without restarting discovery

The transition to the new Session Keys should happen seamlessly: communication should not break, liveliness should not be lost, and therefore Participants should not need to initiate a new discovery process.

KR-R3. Support non-volatile data-protected DataWriters

Non-volatile data-protected DataWriters store historical data encoded in their DataWriter queues. We need to make sure to provide a mechanism for supporting the delivery of this historical data to late joiners after a rekeying event has happened.

There will be no changes concerning who can receive historical data: trusted late joiners will be able to receive any historical data that was produced at any point in the past.

KR-R4: Support long-running systems

The solution should work and remain secure on long-running systems.

KR-R5: Support Durable DataWriter History and Persistence service.

Persistence Service needs to support the mutability of the Session Keys of the Persistence Service DataWriter.

KR-R6: Be backward compatible when the key regeneration feature is disabled

The solution should still interoperate with older Connext versions when the key regeneration feature is disabled.

Participant Revocation and Expiration: Requirements

RE-R1. Minimize PLUGINS Complexity: Promote CORE-driven interactions over Plugin-driven ones To avoid making the plugins even more complex, keep as much state as possible within the core libraries.

RE-R2. Support Connext DDS and PLUGINS APIs to Provide Updated Properties

PLUGINS will support a new API to receive updated PropertyQos configuration. As part of this project, only CRL property, Identity Certificates, and Identity CAs will be supported (see RE-R3. Support mutable CRL property in the PLUGINS, CR-R2. Support mutable Identity Certificate property in the PLUGINS, and CR-R6. Support mutable local Identity CA certificate property in the PLUGINS)

This API will be exposed as a new Domain Participant API for the main Connext DDS APIs.

RE-R3. Support mutable CRL property in the PLUGINS

PLUGINS will support either passing a new CRL in data format or file format. If using file format, users can provide either a path to a different file, or provide a path to an already loaded file that has been updated.

Upon passing an updated CRL to the plugins, the plugins will store the updated state, but they will not take any action yet: core will be driving the revocation process.

RE-R4. Support APIs in the PLUGINS to validate the identity status of a known Participant PLUGINS will support new APIs (validate_local_identity_status, validate_remote_identity_status) to validate the status of an identity (represented by an Identity Handle associated with a Participant) against the currently valid CRL state, expiration dates, and Identity/OCSP CAs' own status (Identity and OCSP CAs could also expire).

By calling these APIs, the core will be able to determine if any authenticated Participant's certificate is revoked or expired.

RE-R5. Support API in the PLUGINS to validate the permissions status of a known Participant PLUGINS will support new APIs (validate_local_permissions_status, validate_remote_pemissions_status) to validate the status of a Permissions Document (represented by a Permissions Handle associated with a Participant) against the currently valid expiration dates. We will check both the Permissions CA and the Permissions Document for expiration.

By calling these APIs, the core will be able to determine if any authenticated Participant's permissions are expired.

RE-R6. Support Dynamic Remote Participant Certificate Expiration or Revocation Remote Participants with an expired certificate (or permissions) will be automatically removed from the local Participant in a way that they can authenticate again once they present new, valid credentials.

Remote Participant certificate (or permissions) revocation will be treated the same as expiration: remote Participant will be removed from the local Participant, but still will be able to start a new authentication (which will fail unless revocation has been lifted by the applicable CA or a new valid non-revoked certificate is presented).

CORE will periodically check for authenticated Participants' identity & permissions status (see RE-R4. Support API in the PLUGINS to validate the identity status of a known Participant and RE-R5. Support API in the PLUGINS to validate the permissions status of a known Participant). If any (one or multiple) remote authenticated Participant certificate (or permissions) is no longer valid, the core will:

1. Remove (see Acronyms and Definitions) the non-trusted Participant(s).
2. Trigger a key regeneration event that effectively will change and redistribute all of the Session Keys for the local Participant in a scalable way (see KR-R1. Support generating and delivering new keys to all of the matched trusted Participants, and to no one else, in a scalable way).

Note that if any authenticated remote Participant's permissions are not valid yet (for example, because of the not before date), the remote Participant will be completely removed from the local Participant. Important: removed, not ignored, we may need to review the current logic.

RE-R7. Support Dynamic Local Participant Certificate Expiration or Revocation CORE will periodically check for local Participant's identity & permissions status. If the local Participant certificate (or permissions) is no longer valid at some point after creation, the core will:

1. Call user callbacks as needed:
   - If validate_local_identity_status determined that the local identity is no longer valid, then the core will invoke a DomainParticipantListener callback on_invalid_local_identity_status so that the user can take corrective action.
   - If validate_local_permissions_status determined that the local permissions are no longer valid, then the core will invoke a DomainParticipantListener callback on_invalid_local_permissions_status so that the user can take corrective action.
   - If a credential is about to expire (i.e., it will expire after certificate expiration advance notice duration), then the core will invoke a DomainParticipantListener callback on_invalid_local_identity_sitatus_advance_notice or or_invalid_local_pemissions_status_advance_notice so that the user can take corrective action ahead of time.
2. Take no additional action (no unmatching, no removal of entities). This way we keep logic simple, prevent potential weird interactions and allow users to fix the issue.

If the local Participant certificate (or permissions) is not valid (either because it is expired or because it is not yet valid) upon creation, Participant creation will fail.

RE-R8. Be robust against Participants leaving the system before their certificate expired/was revoked CORE will keep track of the last N Identity Certificates associated with Participants that left the system since the last key regeneration event. These Identities are considered when calling validate_remote_identity_status and validate_remote_permissions_status. This list is purged when there is a key regeneration event.

When N is reached, trigger a key regeneration event and remove those N certificates. N is configurable with a default of 50. These Identity Certificates will also be part of the checks done as part of RE-R6. Support Dynamic Participant Certificate Expiration.

This will ensure that we will renew keys if at any point in the past we shared keys with a Participant that holds a currently invalid certificate, even if that Participant is not matched anymore with the local Participant.

Note that no special action is required for a recreated local Participant: if the local application is restarted, then its Key Materials are also fresh, and therefore the original list of Participants that the Session Keys have been shared with is no longer relevant.

RE-R9. Support Public API to Securely Stop Communication with a Participants CORE will support a public Participant API (force_key_regeneration) to securely stop communication between the local Participant and any non-trusted remote Participant that had previous access to the Session Keys. By calling this API, the Participant will trigger a key regeneration event.

Note that ignoring a Participant (which is a public API) by itself will not trigger key regeneration. If a user wants to securely stop communication with previously trusted Participants, the user will need to call ignore_participant( ) for all of those Participants and, once all of the ignore participant calls have been completed, then force_key_regeneration( ).

RE-R10. CORE should trigger an identity and permissions status check upon configuration change or API call Upon configuration change or applicable API call, CORE should trigger a status check for the local and remote Participant statuses, so if an identity/permission is no longer trusted, the kicking out of the associated Participant is not delayed.

Participant Identity Certificates Renewal: Requirements

CR-R1. Minimize PLUGINS Complexity: Promote CORE-driven interactions over Plugin-driven ones To avoid making the plugins even more complex, keep as much state as possible within the core libraries.

CR-R2. Support mutable local Identity Certificate property in the PLUGINS

Upon passing an updated local Identity Certificate to the plugins, the plugins will store the updated state for the certificate, but they will not take any action yet: core will be driving the renewal process.

CR-R3. Support Identity Certificate Renewal in the PLUGINS

CORE will trigger the update for the local Participant's Identity certificate in the PLUGINS by using the PLUGINS API validate_local_identity_status introduced in RE-R4.

Support APIs in the PLUGINS to validate the identity status of a known Participant. This API will return a specific status notifying CORE about identity being valid & recently updated.

The new certificate must have the same subject name (as this is tied to the Participant GUID) and public key as the previous identity certificate.

CR-R4. Support CORE-Driven Identity Certificate update announcement CORE will drive the new Identity Certificate update to all of the currently trusted remote Participants without triggering new authentication processes or losing liveliness.

This will be done by propagating an AuthenticatedPeerCredentialToken to all currently trusted remote Participants through the SecureVolatileChannel built-in channel.

CR-R5. Support mutable remote Identity Certificate in the PLUGINS

Upon passing an updated remote Identity Certificate to the plugins, the plugins will store the updated state, but they will not take any action yet: core will be driving the renewal process.

CORE will drive this process through a new PLUGINS API, set_remote_credential_token.

The new certificate must have the same subject name (as this is tied to the Participant GUID) and public key as the previous identity certificate.

The rest of the process will be handled by RE-R6. Support Dynamic Remote Participant Certificate Expiration or Revocation.

CR-R6. Support mutable local Identity CA certificate property in the PLUGINS

Upon passing an updated local Identity CA certificate to the plugins, the plugins will store the updated state, but they will not take any action yet: core will be driving the renewal process.

This includes the identity CA and the OC SP CA (the CA used to verify the signature of OC SP responses).

CR-R7. Support Identity CA Certificate Renewal in the PLUGINS

CORE will trigger the update for the local Participant's Identity certificate against the updated CA in the PLUGINS by using the PLUGINS API validate_local_identity_status introduced in RE-R4. Support APIs in the PLUGINS to validate the identity status of a known Participant. Note that if only the CA has changed (but not the Identity) validate_local_identity_status will just return valid/not valid (it will not trigger Identity Cert propagation).

The new CA certificate must have the same public key as the previous CA certificate.

CR-R8. Support CORE-Driven Permissions Document update announcement

CORE will drive the new Permissions Document update to all of the currently trusted remote Participants without triggering new authentication processes or losing liveliness.

This will be done by propagating an AuthenticatedPeerCredentialToken to all currently trusted remote Participants through the SecureVolatileChannel built-in channel.

CR-R9. Support mutable remote Permissions Document in the PLUGINS

Upon passing an updated remote Permissions Document to the plugins, the plugins will store the updated state, but they will not take any action yet: core will be driving the renewal process.

CORE will drive this process through a new PLUGINS API, set_remote_credential_token.

The rest of the process will be handled by RE-R6. Support Dynamic Remote Participant Certificate Expiration or Revocation.

Design Decisions

Key Regeneration and Redistribution: Design Decisions

To meet the requirements, we defined in section Key regeneration and redistribution: Requirements, we made the following design decisions:

KR-R1. Support generating and delivering new keys to all of the matched trusted Participants, and to no one else, in a scalable way.

KEY IDEA: by only sending a Key Revision Token (KRT) we greatly reduce the generated traffic.

Key Revision Token should contain a sequence of Key Revisions. This allows supporting sending historical KRs when needed (more on this later).

The size of the sequence will depend on the maximum serialized size that does not require fragmentation.

Pros: Very efficient.

Cons: Breaks backward compatibility

KR-R2. Key re-delivery should happen without restarting discovery.

KEY IDEA: the PLUGINS will not start enforcing the new Key Revision until CORE has acknowledged all remote Participants have received the new key revision info.

IMPORTANT: a timeout will control if certain remote Participants are failing to confirm the reception of the latest key revision. After the timeout, we will unmatch the whole remote Participant.

KR-R3. Support non volatile data-protected DataWriters. We need to deliver all the history of keys so they can decode all the historical samples. Options to evaluate (for simplicity, we are going to assume we will use key revision mechanism proposed earlier):

KEY IDEA: Add two builtin, non-configurable parameters that define what is the maximum number of revisions the plugins for a Participant will keep marked as active (it will keep the newest revisions): These parameters (one for live data, one for historical data) will also define the number of revisions a Participant must propagate to remote Participants and the number of revisions each Participant must keep from remotes (to be able to decode data-protected samples). DataWriter queues will lazily re-encode, using the newest active revision, the data-protected samples upon sample retrieval from the DataWriter queue if the key revision used to encode is not active anymore. Also, add a parameter to limit the maximum number of local key revisions a Participant can keep (Key Revision Max. History Depth (KRMHD)), this determines when a write queue reencoding needs to be triggered to update samples that have not been reencoded in a lazy manner. See section Key revisions lifecycle.

Pros

Remote Participants will not receive key revisions marked as inactive.

As the Participant generates new revisions, the list of active key revisions will change, dropping the oldest and adding the newest.

The proposed approach is to send all of the active keys. In the future, we could avoid delivering key revisions unless one of the remote DataReaders has use for them.

Reduced memory requirements for remote Participants

Potential memory reduction for local Participants (it can purge old revisions as samples are re-encoded).

We alleviate the re-encoding costs: users can adjust the number of key revisions they need to keep to avoid too many re-encodings.

Cons

Increased complexity: we need to keep track of

Per local DataWriter

The original keys

The latest derived key for optimized encoding

The oldest key revision required

To quickly check what DataWriters need to re-encode samples going out of the Key Revision Max. History Depth (KRMHD)

Reusable to support only delivering a subset of the active window per remote Participant Ideally, a model to efficiently iterate over the samples that are using old key revisions.

KEY IDEA: Use a REDASequenceNumberIntervalList described in REDASequenceNumberIntervalList.

If a sample needs reencoding (checked through the serialized data crypto header):

We need a re_encode_serialized_payload( ) API that core calls to ask the plugins to decode the serialized data using the right revision (retrieved from the crypto header), and encode it again using the currently active key revision.

KR-R4: Support long-running systems. The current crypto header has too few bytes to store the key id (four bytes).

Four bytes was more than enough when we have one key per endpoint (as it allowed for a total of ~4,200,000,000 endpoints).

Now we need to use those four bytes to represent both key id and revision. If we reserve 2 bytes for revision and 2 bytes for key id, that will leave us with only 64 k revisions for 64 k endpoints, which could be not enough for a system renewing keys relatively quickly for a really long time.

In a system renewing keys every hour, the key revisions will be exhausted after seven years. The existing 4 bytes (2B+2B) are not enough.

KEY IDEA: Define a new crypto header that includes 4 bytes for key id, 4 bytes for revision.

Note: to support one key renewal every one hour during 100 consecutive years we need ~900 k revisions.

This new crypto header will be used by all of the different protection kinds (RTPS, submessage, serialized data). There are multiple reasons for this:

Debuggability/observability: we need to know for each transformation exactly what key (identified by key id and key revision id) has been used.

Availability+performance: Even if RTPS and submessage protection will use the latest key revision most of the time, we need to make sure that everything works smoothly during the key revision transition (when the active key revision is changed): we need to be able to know what revision is the transformed message using to be able to decode it without trying multiple key revisions.

KR-R5: Support Persistence service. Persistence service not prepared for working with mutable DataWriter keys: we will need to store all the history of keys a DataWriter has been using to protect the serialized user data.

KEY IDEA: in addition to the original crypto tokens, we will need to store the key revision info together with the existing original CryptoTokens. Since serialized data entries already store the associated key id, Persistence Service will be able to retrieve the right CryptoToken+KeyRevisionToken for decoding encoded serialized data.

Since introducing a new table at the Participant level would be complicated, the key revision info is duplicated across DataWriters, Persistence Service should store a list of key revision info(s) per local DataWriter. This key revision info must be encrypted. To reduce configuration options, we will reuse the existing "dds.data_writer.history.key_material_key" property to configure the key to protect the Participant Key Revisions. Setting this property is already required when using Persistence Service with security.

KR-R6: Be backward compatible when the key regeneration feature is disabled. KR-R4-1's new crypto header format will not interoperate with versions of Security PLUGINS that do not support the key regeneration feature. Therefore, we must allow for the use of the old crypto header format when the feature is disabled. The feature may be enabled or disabled at the Participant level, the endpoint level, or the message level. We need to decide the granularity at which the feature can be enabled or disabled.

KEY IDEA: Participant level. Introduce a flag to the ParticipantSecurityAttributes that indicates whether or not key revisions are enabled. Two Participants must have equal values of this flag in order to be matched with each other. KRMHD is configurable. If KRMHD is set to 0, then the flag is set to 0. Otherwise, the flag is set to 1. By default, the new functionality will be disabled.

PARTICIPANT_SECURITY_ATTRIBUTES_FLAG_ARE_KEY_REVISIONS_ENABLED (0x00000001<<3)

Participant Revocation and Expiration: Design Decisions

RE-R1: Minimize PLUGINS Complexity: Promote CORE-driven interactions over Plugin-driven ones KEY IDEA: CORE (and not the security plugins) will drive Participant revocation and expiration checks. The security plugins will provide APIs to provide updated info about an Identity Certificate's validity and well-standing.

Pros:

Reduces PLUGINS complexity.

Reduces the number of interactions back and forth between the plugins and the core.

Cons:

Reduces shareable code with Micro.

RE-R2: Support Connext DDS and PLUGINS APIs to Provide Updated Properties

KEY IDEA: The Security PLUGINS will expose an API to provide updated properties for any plugin.

Only certain properties that are explicitly marked as mutable will be eligible to be updated through this API.

RE-R3: Support mutable CRL property in the PLUGINS

KEY IDEA: The Security PLUGINS will support changing the CRL configuration after initial plugin creation.

New CRL configuration will be provided by RE-R2 by passing an updated CRL property.

Both file and data formats will be supported.

Like certificates, the CRLs should be read through the OSSL_STORE interface when possible.

CRL file mutability:

When providing a file path, the file path could be the same as the original one. Still, the CRL will be loaded again from the file (which may have been updated).

RE-R4. Support APIs in the PLUGINS to validate the identity status of a known Participant KEY IDEA: We are adding the following Authentication PLUGINS APIs:

validate_local_identity_status.

validate_remote_identity_status

RE-R5. Support API in the PLUGINS to validate the permissions status of a known Participant KEY IDEA: We are adding the following AccessControl PLUGINS APIs:

validate_local_permissions_status validate_remote_permissions_status

RE-R6. Support Dynamic Remote Participant Certificate Expiration or Revocation

KEY IDEA: Upon Participant revocation or expiration, Participants will be removed, never ignored.

This requires changing current behavior, where we ignore Participants when authorization fails.

RE-R7. Support Dynamic Local Participant Certificate Expiration or Revocation

KEY IDEA: If the local Participant certificate (or permissions) is no longer valid at some point after creation, the core will:

1. Call user callbacks as needed:

If validate_local_identity_status determined that the local identity is no longer valid, then the core will invoke a DomainParticipantListener callback on_invalid_local_identity_status so that the user can take corrective action.

If validate_local_permissions_status determined that the local permissions are no longer valid, then the core will invoke a DomainParticipantListener callback on_invalid_local_permissions_status so that the user can take corrective action.

2. Take no additional action (no unmatching, no removal of entities). This way we keep logic simple, prevent potential weird interactions, and allow users to fix the issue.

KEY IDEA: If the local Participant certificate (or permissions) is not valid (either because it is expired or because it is not yet valid) upon creation, Participant creation will fail.

RE-R8. Be robust against Participants leaving the system before their certificate expired/was revoked KEY IDEA: CORE will keep track of the last N Identity Certificates associated with Participants that left the system since the last key regeneration event. When N is reached, trigger a key regeneration event and remove those N certificates. N is configurable with a default of 50.

RE-R9. Support Public API to Securely Stop Communication with a Participants

KEY IDEA: CORE will support a public Participant API (banish_participant( )) which ignores a Participant and triggers a key regeneration event.

RE-R10. CORE should trigger an identity and permissions status check upon configuration change or API call Participant Identity Certificates Renewal: Design Decisions CR-R1. Minimize PLUGINS Complexity: Promote CORE-driven interactions over Plugin-driven ones KEY IDEA: CORE (and not the security plugins) will drive Participant revocation and expiration checks. The security plugins will provide APIs to provide updated info about an Identity Certificate's validity and well-standing.

CR-R2. Support mutable local Identity Certificate property in the PLUGINS

KEY IDEA: This will reuse the same mechanism for asserting properties introduced in RE-R2.

CR-R3. Support Identity Certificate Renewal in the PLUGINS

KEY IDEA: Driven by the new Authentication PLUGINS validate_local_identity_status API already introduced in RE-R7.

If there is an update in the Identity status because of any of the associated artifacts (CA, CRL, Identity Cert) and if the Identity is still valid, it will return a separate retcode to notify that the Identity is VALID&UPDATED (which will require propagation to other peers).

CR-R4. Support CORE-Driven Identity Certificate update announcement

KEY IDEA: This will be done by propagating an AuthenticatedPeerCredentialToken to all currently trusted remote Participants through the SecureVolatileChannel built-in channel.

SecureVolatileChannel already supports the concept of propagating security tokens, and the communication model (reliable p2p) makes sense for propagating AuthenticatedPeerCredentialToken.

If we upgrade the identity/permissions when a Participant was completing authentication with us (but before establishing the secure volatile channel with it) we cannot let the credential update be missed. We need to make sure we publish the credential right after the authentication.

CR-R5. Support mutable remote Identity Certificate in the PLUGINS

KEY IDEA: We are adding the following Authentication PLUGINS API:

set remote credential token

CR-R6. Support mutable local Identity CA certificate property in the PLUGINS

KEY IDEA: This will reuse the same mechanism for asserting properties introduced in RE-R2.

CR-R7. Support Identity CA Certificate Renewal in the PLUGINS

KEY IDEA: Driven by the new Authentication PLUGINS validate_local_identity_status API already introduced in RE-R7.

CR-R8. Support CORE-Driven Permissions Document update announcement

KEY IDEA: This will be done by propagating an AuthenticatedPeerCredentialToken to all currently trusted remote Participants through the SecureVolatileChannel built-in channel.

SecureVolatileChannel already supports the concept of propagating security tokens, and the communication model (reliable p2p) makes sense for propagating AuthenticatedPeerCredentialToken.

If we upgrade the identity/permissions when a Participant was completing authentication with us (but prior to establishing the secure volatile channel with it) we cannot let the credential update be missed. We need to make sure we publish the credential right after the authentication.

CR-R9. Support mutable remote Permissions Document in the PLUGINS

KEY IDEA: To support future permissions mutability we will add the following AccessControl PLUGINS API:

set remote credential token

General Flow

Key Regeneration and Redistribution: General Flow

Supporting Basic Case of Key Regeneration and Distribution

Connext DDS Secure sender Session Key redistribution will have the following steps:

1. CORE: Request the DDS Security plugins (PLUGINS) to generate a new key_revision for the Participant and all its contained secure entities.
   a. key_revision will only apply to master_sender_key and master_salt (we will refer to these as original key material) and it will NOT apply to master_receiver_specific_key: regenerating them will be expensive and does not provide additional security. This is because changing the sender key will already protect revoked Participants from accessing the exchanged messages, and also because master_receiver_specific_key information shared with the Participant to revoke is only relevant to him. In the same manner, there is no reason to change the master_salt used to derive the SessionReceiverSpecificKey (regenerating a new salt for receiver-specific keys after a regeneration event adds no security to derived keys with respect to the original keys, as the original salt was already known by all of the potential "receiver-specific attackers" before regeneration). Consequently, SessionReceiverSpecificKeys will still be derived from the original master_salt.
   b. key_revisions vs new keys: Instead of delivering N local new keys to M remote Participants, we will send ONE piece of information (key_revisions) to M remote Participants upon re-keying. This will save a lot of bandwidth and will increase system scalability.
   c. Participants will use key_revisions to derive new keys from the original key material. These new keys will still be associated with the same crypto handles (i.e., one crypto handle is associated with all the history for a given key, including all of its regenerations).
2. CORE: Upon rekeying, a Participant will send the same key_revision to all of the currently trusted remote Participants. A key_revision is a tuple of key_revision_id+random crypto material seed (key_revision_secret_seed).
   a. This key revision will be sent as part of a new Key Exchange (Secure Volatile) Channel sample: the key_revision_token. The key_revision_secret_seed is used to derive new key material (and therefore, SessionKeys), while the key_revision_id is used to derive unique ids for the derived key material.
   b. We will need to do M remote Participants directed writes (as opposed to doing N×M directed writes, where M=number of remote trusted Participants and N=number of local DataWriters) on the Secure Volatile channel. This will greatly reduce the required network traffic to derive updated SessionKeys.
3. CORE: The remote Participants will derive the new N keys for the other Participant by applying the key_revision_secret_seed to the already received N original keys to generate the new keys. The received key_revision_id will be used to generate the crypt ids for those new N keys.
   a. As a memory optimization on the receiver side, we can store just the N original keys, plus the X number of key revision updates, each one with its own revision_id. When we are going to decode, we will derive the key from combining the proper original key and key revision entry.
   b. Alternatively, we will provide the concept of an "active window" that will represent the list of X key revisions that are currently valid for a Participant. We will detail this later.
4. CORE: Once a Participant has successfully delivered the new key_revision to all of its trusted remote Participants (or after a timeout), it will notify the PLUGINS.
   a. The Participant will determine whether the key_revision has been successfully delivered to all of the trusted remote Participants by leveraging the DDS Security Secure Volatile channel (the reliable and secure DDS topic used to deliver the Key Material and Key Revisions) reliability protocol information.
5. PLUGINS: Activate the new key_revision, which will effectively mean that PLUGINS will use the new keys for the existing crypto handles by combining the corresponding original key material with the latest key_revision.
6. CORE: If applicable, delete old key_revision through a PLUGIN API.

Supporting Data Protection for Historical Data

One of the main challenges introduced by key revisions is how to handle the samples encoded in the DataWriter queue. While RTPS and submessage protection kinds are computed "on the fly" with the latest revision, samples on the DataWriter queue are encoded whenever the sample was added to the queue, and they remain encoded forever. After adding key revisions, this is now a problem because we need to either:

Keep the history of all the key revisions we need to propagate to remote Participants so they can decode the samples using old encoding.

Re-encode the samples in the queue (decoding with the old key revision and encoding with the new key revision).

We want to be efficient both bandwidth-wise and CPU-wise. To achieve this, we came up with the following strategy:

1. Participants will only announce the key revisions within a certain window (Key Revision Window (KRW), see Key revisions lifecycle).
2. Participants will keep the full local history of key revisions (limited by Key Revision Max. History Depth (KRMHD) resource limit, as it will be described later in Key revisions lifecycle). To support the KRMHD resource limit (or if in the future we want to selectively send a subset of the window to a remote Participant):

Each DataWriter will cache the oldest key_revision_id he is using in his DataWriter Queue. This oldest key_revision_id will be checked and potentially re-evaluated upon hitting the KRMHD resource limit on the Participant.

3. Participants will only keep the remote Participants' current Key Revision Window (plus one, as explained in Key revisions lifecycle).
4. Writer queues will lazily re-encode the data-protected samples upon sample retrieval from the DataWriter queue if the key revision used to encode is not part of the current KRW. To support this:

We need a re_encode_serialized_payload( ) API that core calls to ask the plugins to decode the serialized data using the right revision (retrieved from the crypto header), and encode it again using the currently active key revision.

Key Revisions Lifecycle

DDS Entities apply RTPS and submessage protection upon generating/sending RTPS messages. As a consequence of this, DDS Entities will always use the latest key revision available when encoding for these protection kinds. Data protection works differently: DataWriters exercise data protection upon adding samples to the DataWriter Queue.

Just reencoding the full DataWriter history to use the latest key revision each time a key revision is generated would scale poorly for non-volatile DataWriters. To address this issue, we define two concepts:

PLUGINS Key Revision Window (KRW): A set of key revisions that the plugins have marked as active. Active Key Revisions are the set of Key Revisions for a local Participant that are available to remote Participant's DataReaders so they can decode historical data-protected samples. When repairing a data-protected sample, if the sample was encoded with a key revision within the KRW, it will be sent as it is. However, if the sample was encoded with a key revision that is currently outside the KRW, it will be reencoded with the latest key revision.

Participant Key Revision Max. History Depth (KRMHD) The maximum number of key revisions a Participant will keep around at a given time. It can be greater than or equal to the KRW size. It effectively determines what is the oldest local Key Revision a Participant will have available to decode samples from the DataWriter Queue, which is a prerequisite to re-encode those samples. When this limit is reached, the Participant will need to re-encode all of the DataWriter Queues' samples that were encoded with the oldest Key Revision (as this Key Revision needs to be removed to make room for a new one).

Non-Configurable KRW

To make system configuration easier, we only allow for two possible values for the KRW:

ONE for live data, RTPS protection, and submessage protection: Only one key revision will be active for live data, RTPS protection, and submessage protection on the sender. On the receiver side, a maximum of two elements will be kept (see Implications on Integrity/Confidentiality): this will prevent from failing to decode samples because of timing issues when receiving a sample that uses a key revision that just went out of the active window.

SEVEN for historical data for non-volatile DataWriters: A total of seven key revisions will be kept to reduce the number of re-encodings needed for historical data. On the receiver side, a maximum of eight elements will be kept (see Implications on Integrity/Confidentiality): this will prevent from failing to decode samples because of timing issues when receiving a sample that uses a key revision that just went out of the active window.

Moving the KRW

Upon new key revision generation, the plugins will not remove the oldest member of the key revision window yet. The Participant will propagate the new key revision to the remote Participant so they can update their windows. Once all of the trusted remote Participants have acknowledged the reception of the new key revision, CORE will mark the new key revision as active and then the oldest member of the key revision window will be removed in the plugins. If, while waiting for acknowledgments, the Participant attempts to generate a new key revision, CORE will post an event to do this generation later. As long as the latest acknowledged revision is not the latest revision that was generated, this event will be postponed.

When a Participant discovers a new remote Participant, it will obtain the key revisions belonging to the current local KRW from the plugins as crypto tokens, and then share those crypto tokens with the discovered Participant.

Purging Old Key Revisions

As mentioned earlier, the KRW is PLUGINS concept that represents the set of Key Revisions for a local Participant that are available to remote Participant's DataReaders so they can decode historical data-protected samples. However, this KRW does not limit the number of key revisions the local Participant needs to keep around.

Since a DataWriter needs the key revision a given sample was encoded with to be able to re-encode that sample, and since DataWriters will re-encode samples lazily (only upon repairing a sample that has a key revision outside of the KRW), we need some sort of resource limit to avoid the list of old key revisions to grow unbounded. This is the Key Revision Max. History Depth (KRMHD) (default value: 0; range: 0 or 7-59652323), and it is managed at Participant level. This parameter will be immutable. Note: if KRW could get any value, we would need a KRMHD with a minimum of 2 it is because we need to keep re-encoding samples with the oldest revision before introducing the new revision. Since KRW can be of 1 or 7, we need a minimum of 7 for the KRMHD.

When the number of Key Revisions a Participant has created and not destroyed reaches the KRMHD, the Participant will purge the oldest key revision, so it can make room for a new one. To achieve this, it will check for each of its DataWriters, what is the oldest key revision the DataWriter is using in his DataWriter Queue. Each DataWriter whose oldest key revision matches the key revision to be removed will reencode (with the latest active key revision) all of the samples encoded with the oldest key revision.

Note that since we generally re-encode lazily, we cannot make assumptions about key revisions in use by a DataWriter based on SN order. We will need to check the key revision_id for every sample we need to evaluate.

Interaction with Compression

Because we compress, then encrypt, we do not need to recompress when we to reencode.

Implications on Integrity/Confidentiality

Keeping more than one (the latest) key revision active has implications on integrity and confidentiality:

Confidentiality: Messages sent with an older key revision will be readable by Revoked Participants that were exposed to that revision. This is acceptable only for historical data (as that was already exposed anyways). As such, in the sender, we should only use a KRW >1 for payload protection of non-live data.

NOTE: By enabling RTPS or submessage encryption it will be possible to completely protect exchanged historical data.

Integrity: On the receiver side, accepting messages that are using an older key revision will allow untrusted Participants that were exposed to the old key revision to impersonate other Participants unless the system is using receiver-specific MACs. To avoid this vulnerability, receivers should only keep KRW+1 key revisions during the transition to a new key: this is, upon receiving a message that is using the newest element on the KRW, receivers should switch to only accept KRW.

Participant Revocation and Expiration

The user provides new CRL through set(QoS/property) user-level APIs

CORE propagates the update to the plugins as updated properties through a new set of assert_property( ) APIs added to each plugin.

PLUGINS will update their internal state to keep the new artifacts, but will not update any security-related state.

CORE periodically calls the following APIs:

validate_local_identity_status
validate_remote_identity_status
validate_local_permissions_status
validate_remote_permissions_status CORE can also call the above APIs upon certain user-level API calls, including:

setQos( )
setProperty( )

Upon getting an INVALID status for validate_local_identity_status or validate_local_permissions_status:

If it happens during Participant creation, it fails.

If it happens for an already created Participant, the user is notified through new callbacks (on_invalid_local_identity_status/on_invalid_local_perrnissions_status). No additional AI is taken.

Need a property to give an advance notice certificate_expiration_advance_notice_not_a_period:)
certificate_expiration_advance_notice_time
certificate_expiration_advance_notice_duration Upon getting an INVALID status for validate_remote_identity_status or validate_remote_permissions_status:

The associated remote Participant will be removed.

A key regeneration event will be triggered.

CORE will keep track of the last N Identity Handles (with the minimum info needed to keep checking the CRL, OCSP, expiration date, permission expiration date, and permission signature) associated with Participants that left the system since the last key regeneration event.

These Identity Handles are considered wrt calling validate_remote_identity_status and validate_remote_permissions_status.

If there is a key regeneration event, this list is purged.

When N is reached, force a key regeneration event.

Participant Identity Certificates Renewal

The user provides a new CRL, Identity Certificate (keeping the same Identity), Identity CA, or other Identity-related artifacts through set(QoS/property) user-level APIs CORE propagates this to the plugins as updated properties through the assert_property( ) functionality PLUGINS will update the internal state to keep the new artifacts, but will not update any security-related state.

CORE will use the same mechanism we added as part of the "Participant Revocation and Expiration" to check for local identity & permission status.

This involved calls to the following APIS:

validate_local_identity_status
validate_local_permissions_status

The validate_local_xxxx_status APIs will return a special status (UPDATED) if the (identity/permissions) associated artifacts were updated and if the (identity/permissions) are still valid.

IF we got "UPDATED" status from a call to validate_local_xxxx_status:

CORE will call:

Authentication's get_local_credential_token(out: AuthenticatedPeerCredentialToken, in:IdentityHandle, out: SecurityException)

This will return the local Participant's AuthenticatedPeerCredentialToken

CORE will propagate the new AuthenticatedPeerCredentialToken to other trusted remote Participants using the SecureVolatileChannel.

For Participants authenticating at the same time there is a credential update, the ongoing authentication:

May fail, we acknowledge and accept that: a timeout will trigger at some point and a new authentication will start.

May succeed: we need to make sure an AuthenticatedPeerCredentialToken is sent as soon as the SecureVolatileChannel is created.

IF a Participant gets an AuthenticatedPeerCredentialToken through the SecureVolatileChannel:

CORE will call set_remote_credential_token in both Authentication and AccessControl to update the artifacts as needed.

Any ongoing secondary authentication should be canceled: if the remote Participant has sent us a new credential, it does not make sense to continue with the state machine.

CORE will use the same mechanism we added as part of the "Participant Revocation and Expiration" to check for remote identity & permission status.

This involved calls to the following APIS:

validate_remote_identity_status
validate_remote_permissions_status

No other changes, there is no key regeneration upon artifact renewal.

New Types and SPIs

Key Regeneration and Redistribution: New Types and SPIs

RTI Security IDL

```
struct KeyRevisionListHandle {
   /*
    * For a local handle, these numbers cover the range
of
    * currently active key_revisions for a local
Participant.
    *
    * For a remote handle, these numbers cover the range
of
    * key revisions received from a remote Participant
that
    * are active.
```

-continued

```
    */
    unsigned long activeRevisionIdBegin;
    unsigned long activeRevisionIdEnd;
    /*
     * For a local handle, this list contains all the
created
     * (and not returned) key_revisions.
     *
     * For a remote handle, this list contains the range
of
     * key revisions that are active for a remote
Participant.
     */
    native *revisionInfoList;
};
typedef sequence<DataHolder> KeyRevisionInfoTokenSeq;
boolean
    create_local_key_revision(
        inout unsigned long                    key_revision_id,
        in                                   ParticipantCryptoHandle
local_participant_crypto,
        inout SecurityException                 ex );
boolean
    activate_local_key_revision(
        in      unsigned int                   revision_id,
        in                                   ParticipantCryptoHandle
local_participant_crypto,
        inout SecurityException                 ex );
boolean
    create_local_key_revision_tokens(
        inout                                KeyRevisionInfoTokenSeq
latest_key_revision_token,
        inout                                KeyRevisionInfoTokenSeq
all_key_revision_tokens,
        in                                     unsigned         int
max_all_key_revision_tokens,
        in                                   ParticipantCryptoHandle
local_participant_crypto,
        inout SecurityException                 ex );
boolean
    return_local_key_revision_tokens(
        in                                   KeyRevisionInfoTokenSeq
key_revision_tokens,
        inout SecurityException                 ex );
boolean
    set_remote_key_revision_tokens(
        in                                   ParticipantCryptoHandle
local_participant_crypto,
        in                                   ParticipantCryptoHandle
remote_participant_crypto,
        in                                   KeyRevisionInfoTokenSeq
remote_key_revision_tokens,
        inout SecurityException                 ex );
boolean
    re_encode_serialized_payload(
        inout                                      OctetSeq
encoded_serialized_payload,
        in      DataWriterCryptoHandle          crypto_handle,
        inout SecurityException                 ex );
boolean
re_encode_serialized_payload_from_durable_writer_histo
ry(
        inout                                      OctetSeq
encoded_serialized_payload,
        in                                           Boolean
key_revisions_previously_enabled,
        in                                   KeyRevisionInfoTokenSeq
historical_key_revision_tokens,
        in      DataWriterCryptoHandle          crypto_handle,
        inout SecurityException                 ex );
```

RTI API Detailed Description

In this section, we will follow DDS Security notation. In Implementation Detailed Design we will detail the exact mapping for the Connext DDS Secure implementation of these APIs (e.g., instead of OctetSeq type we use DDSBuffer type to pass sequences of bytes).

```
create_local_key_revision
boolean
    create_local_key_revision(
        inout unsigned long                    key_revision_id,
        in                                   ParticipantCryptoHandle
local_participant_crypto,
        inout SecurityException                 ex );
```

This function is called when we need to regenerate new keys. If necessary (due to KRMHD limit being reached), this function will remove the oldest key revision from the local_participant_crypto's list of key revisions in order to make room for the new key revision. Before calling this function, you must call re_encode_serialized_payload on all of the samples encoded with the oldest key revision.

Parameter key_revision_id: This output parameter identifies a key revision.

Returns true on success and false on failure.

```
activate_local_key_revision
boolean
    activate_local_key_revision(
        in      unsigned int                   revision_id,
        in                                   ParticipantCryptoHandle
local_participant_crypto,
        inout SecurityException                 ex );
```

This function is called on the plugins after create_local_key_revision is called, and only once the key revision info has been delivered to all of the relevant remote Participants. This function is responsible for notifying the senders that they should start using the new derived key for that CryptoHandle.

Parameter revision_id: This parameter identifies the revision to be activated. It may not be the latest revision if there has been another key change while waiting for a previous revision to be delivered.

Returns true on success and false on failure.

```
create_local_key_revision_tokens
boolean
    create_local_key_revision_tokens(
        inout                                KeyRevisionInfoTokenSeq
latest_key_revision_token,
        inout                                KeyRevisionInfoTokenSeq
all_key_revision_tokens,
        in                                     unsigned         int
max_all_key_revision_tokens,
        in                                   ParticipantCryptoHandle
local_participant_crypto,
        inout SecurityException                 ex );
```

This function is called on the plugins after create_local_key_revision is called. This function is responsible for generating the message contents for key revisions.

Parameter latest_key_revision_tokens: This output parameter contains the contents of a message that should be sent to existing remote Participants after a new key revision is created. It should contain one token for the latest key revision that was just created. Existing remote Participants only need to learn about the latest revision, since it already knows about the previous revisions.

Parameter all_key_revision_tokens: This output parameter contains the contents of a message that should be sent to newly-discovered remote Participants. It should contain many tokens, one for each key revision in the KRW. Newly-discovered remote Participants need to learn about all available revisions.

Parameter max_all_key_revision_tokens: This parameter contains the maximum number of elements that all_key_revision_tokens should contain. If the local Participant currently has no data-protected DataWriters that are reliable or non-volatile, then this parameter shall be 2. Otherwise, it shall be 7.

Parameter local_participant_crypto: The local Participant CryptoHandle, which internally contains the list of key revisions.

Returns true on success and false on failure.

```
return_local_key_revision_tokens
boolean
  return_local_key_revision_tokens(
    in                    KeyRevisionInfoTokenSeq
key_revision_tokens,
    inout SecurityException
```

This function is called on the plugins after the key revision tokens created by create_local_key_revision tokens are sent.

Parameter key_revision_tokens: The key revision tokens created by create_local_key_revision tokens.

Returns true on success and false on failure.

```
set_remote_key_revision_tokens
boolean
  set_remote_key_revision_tokens(
    in                    ParticipantCryptoHandle
local_participant_crypto,
    in                    ParticipantCryptoHandle
remote_participant_crypto,
    in                    KeyRevisionInfoTokenSeq
remote_key_revision_tokens,
    inout SecurityException    ex );
```

This function is called on the plugins after the output of create_local_key_revision_tokens is received. This function is responsible for processing the message contents for key revisions.

Parameter local_participant_crypto: Unused, but set_remote_participant_crypto_tokens also has it.

Parameter remote_participant_crypto: This parameter will be updated with a new key revision.

Parameter remote_key_revision_tokens: This parameter contains the message contents. It contains one token per revision_id within the begin-end range.

Returns true on success and false on failure.

```
re_encode_serialized_payload
boolean
  re_encode_serialized_payload(
    inout                          OctetSeq
encoded_serialized_payload,
    in    DataWriterCryptoHandle        crypto_handle,
    inout SecurityException             ex );
```

This function is called on the plugins after checking that the key revision version stored with the serialized sample's crypto header belongs to a revision that went out of the KRW. It is also called on the plugins after the KRMHD limit has been reached, and samples encoded with the oldest key revision need to be re-encoded with a new key revision. The goal is to re-encode the encoded_serialized_payload using the latest active key revision.

Parameter encoded_serialized_payload: The caller passes in the serialized payload encoded with an old key. The plugins will repopulate this buffer with the serialized payload encoded with the latest active key revision. The plugins will use their own scratch buffer where the plugins can put the decoded serialized payload (since the plugins need to decode and then re-encode the serialized payload).

Parameter crypto_handle: The DataWriter's crypto handle that was used to encode the payload. This CryptoHandle also contains the key revision that will be used to provide the new encoding.

Returns true on success and false on failure.

```
re_encode_serialized_payload_from_durable_writer_history
boolean
re_encode_serialized_payload_from_durable_writer_histo
ry(
  inout                               OctetSeq
encoded_serialized_payload,
  in                                  Boolean
key_revisions_previously_enabled,
  in                           KeyRevisionInfoTokenSeq
historical_key_revision_tokens,
  in    DataWriterCryptoHandle        crypto_handle,
  inout SecurityException             ex );
```

This function is called on the plugins when restoring a sample from durable DataWriter history. It is called under the following conditions:

- The sample was stored by a DataWriter whose DomainParticipant did not enable key revisions, and the restoring DataWriter's DomainParticipant is enabling key revisions.
- The sample was stored by a DataWriter whose DomainParticipant did enable key revisions, and the restoring DataWriter's DomainParticipant is not enabling key revisions.
- Both the storing and the restoring DataWriter's DomainParticipants enabled key revisions, and either
  - this specific sample was encoded with a non-zero key revision ID, or
  - the 0th key revision is no longer in the KRMHD of the restoring DataWriter's DomainParticipant.

The first two conditions are necessary because the CryptoHeader has a different format depending on whether or not key revisions are enabled (see New CryptoTransformIdentifier_v2 structure).

Parameter encoded_serialized_payload: same as re_encode_serialized_payload

Parameter key_revisions_previously_enabled: true if key revisions were previously enabled. This information should be retrievable from the durable DataWriter history. See Restore=0.

Parameter historical_key_revision_tokens: the key revision tokens retrieved from the durable DataWriter history. This will be used to decode the sample.

Parameter crypto_handle: The DataWriter's crypto handle, which contains the key revision that will be used to provide the new encoding.

New KeyRevision Tokens ParticipantGenericMessage class

#define GMCLASSID_SECURITY_KEY_REVISION_TOKENS\"dds.sec.key_revision_tokens"

If GenericMessageClassId is GMCLASSID_SECURITY_KEY_REVISION_TOKENS, the message_data attribute shall contain a KeyRevisionTokenSeq having N elements.

This message is intended to send key_revisions from one DomainParticipant to another.

The destination_participant_guid shall be set to the GUID t of the destination DomainParticipant.

The destination_endpoint_guid shall be set to GUID UNKNOWN. This indicates that there is no specific endpoint targeted by this message: It is intended for the whole DomainParticipant.

The source_endpoint_guid shall be set to GUID UNKNOWN.

The message_class_id shall be set to "dds.sec.key_revision_tokens"

The message_data shall have one element per key revision. For each element:

The class_id shall be set to "DDS:KeyRevision"

The binary_properties shall have one element:

name: "dds.cryp.keyrev"

value: the big endian CDR serialization of the structure defined below

```
struct KeyRevisionInfo {
   DDS_UnsignedLong revision;
   DDS_Octet revision_secret_seed[32];
};
```

revision_secret_seed is a random array of 32 bytes (256 bits, matching AES256 key length). revision is a counter that increments by one every time the KeyRevisionInfo is changed for a given Participant. Using the KeyRevisionInfo received from a remote Participant, a Participant can compute new key material for every single original key material he has previously received (i.e., any previously received remote DataWriters key material, remote DataReaders key material, and Participant key material).

Key Material Derivation

The new key material is calculated as follows:

new_sender_key_id=original sender_key_id new_revision=revision new_master_salt=HMAC-SHA256 (HMAC-SHA256(revision_secret_seed, original_master_salt), "master salt derivation"|0x01)

new_master_sender_key=HMAC-SHA256(HMAC-SHA256(revision_secret_seed, original_master_sender_key), "master sender key derivation" |0x01)

These calculations map to RFC5869 (HMAC-based Extract-and-Expand Key Derivation Function (HKDF)) sections 2.2 and 2.3 as follows:

$$T=T(1)|T(2)|T(3)| \ldots |T(N)$$

OKM=first L octets of T

PRK=HMAC-Hash(salt, IKM)

T(0)=empty string (zero length)

T(1)=HMAC-Hash(PRK, T(0)|info|0x01)

T(2)=HMAC-Hash(PRK, T(0)|info|0x02)

T(3)=HMAC-Hash(PRK, T(0)|info|0x03)

. . .

T(N)=HMAC-Hash(PPK, T(N−1)|info|N)

To derive the new_master_salt we apply the algorithm once (to obtain $T_{SALT}$ (1)):

L=32 new_master_salt=$OKM_{SALT}$=$T_{SALT}$(1)

$salt_{SALT}$=revision_secret_seed $IKM_{SALT}$=original_master_salt $info_{SALT}$="master salt derivation"

Hash=SHA256

Hashlen=32

So we have:

$PRK_{SALT}$=HMAC-SHA256(revision_secret_seed, original_master_salt)

$OKM_{SALT}$=$T_{SALT}$(1)=HMAC-SHA256($PRK_{SALT}$, "master salt derivation"|0x01)

new_master_salt=$OKM_{SALT}$=HMAC-SHA256(HMAC-SHA256(revision_secret_seed, original_master_salt), "master salt derivation"|0x01)

To derive the new_master_sender_key we apply the algorithm once (to obtain $T_{KEY}$(1))

L=32 new_master_sender_key=$OKM_{KEY}$=$T_{KEY}$(1)

$salt_{KEY}$=revision_secret_seed $IKM_{KEY}$=original_master_sender_key $info_{KEY}$="master sender key derivation"

Hash=SHA256

Hashlen=32

So we have:

$PRK_{KEY}$=HMAC-SHA256(revision_secret_seed, original_master_sender_key)

$OKM_{KEY}$=$T_{KEY}$(1)=HMAC-SHA256 ($PRK_{KEY}$, "master sender key derivation"|0x01)

new_master_sender_key=$OKM_{KEY}$=HMAC-SHA256 (HMAC-SHA256 (revision_secret_seed, original_master_sender_key), "master sender key derivation"|0x01)

Notes

We are deriving both a new_master_sender_key and a new_master_salt. We do this to grant derived keys a similar level of security to what brand new original keys had before a potential security breach: even if a malicious insider had access to the original_master_sender_key and original_master_salt, he will have no knowledge of what the derived new_master_sender_key and new_master_salt are (so we keep new salt secret as it was for original keys).

The key revision process has no impact on the Session Receiver-Specific Keys: master_receiver_specific_key remains unchanged and we keep using the original master_salt to derive the Session Receiver-Specific Keys. This decision is based on two reasons:

1. Regenerating the receiver-specific key or salt adds no additional security: this is because (1) changing the sender key already prevents revoked Participants from accessing the exchanged messages, (2) master_receiver_specific_key information shared with the Participant to revoke is only relevant to him, and (3) the original master_salt was already known by all the potential insider attackers, so not changing it will not make the Session Receiver-Specific Keys less secure.
2. This allows us to simplify the logic and reduce the cpu overhead by avoiding regenerating the Session Receiver-Specific Keys when the Key revision process triggers.

New CryptoTransformIdentifier_v2 structure

```
typedef octet CryptoTransformKeyRevisionId[4];
struct CryptoTransformIdentifier_v2 {
   CryptoTransformKind transformation_kind;
   CryptoTransformKeyId transformation_key_id;
   CryptoTransformKeyRevisionId
transformation_key_revision_id;
};
```

If a Participant enables the key regeneration feature, then it will serialize CryptoTransformIdentifier_v2 in all of its crypto headers. Otherwise, it will serialize CryptoTransformIdentifier in all of its crypto headers.

Revocation and Expiration: New Types and APIs

```
on_invalid_local_identity_status
typedef enum {
  DDS_NOT_INVALIDATED,
  DDS_INVALIDATED_BY_IDENTITY_CA_EXPIRATION,
DDS_INVALIDATED_BY_IDENTITY_CERTIFICATE_EXPIRATION,
  DDS_INVALIDATED_BY_IDENTITY_CERTIFICATE_REVOCATION
} DDS_IdentityInvalidatedStatusKind;
typedef                                  void(*
DDS_DomainParticipantListener_OnInvalidLocalIdentitySt
atusCallback)          (void          *listener_data,
DDS_DomainParticipant                   *participant,
DDS_IdentityInvalidatedStatusKind *last_reason)
```

Flow Description

Key Regeneration and Redistribution: Examples

Generating and Distributing Key Revisions

FIG. 1 Propagation of original and updated DataWriter Key Material to derive Session Keys.

Figure 2:
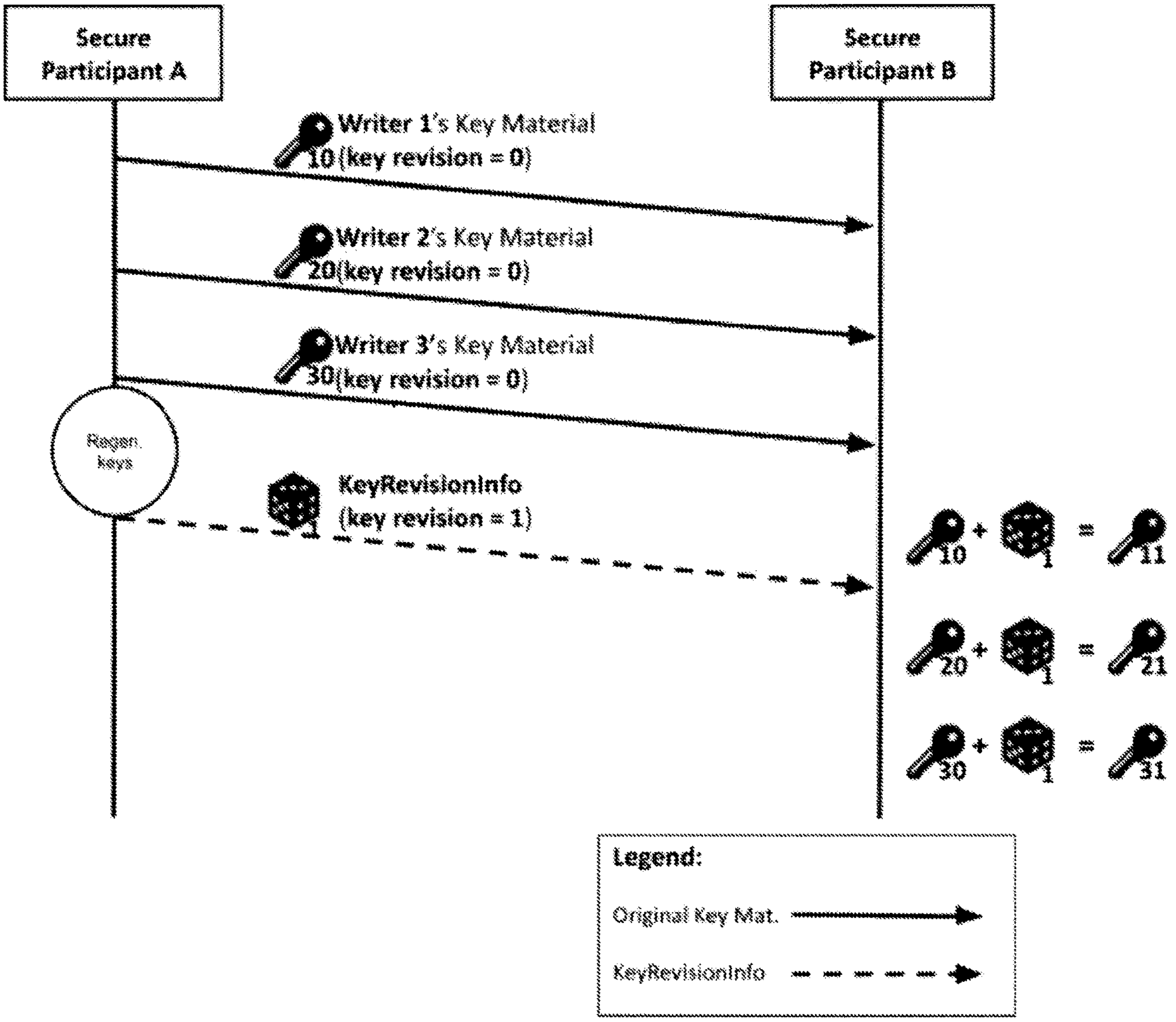
FIG. 2 shows according to an exemplary embodiment of the invention scalable propagation of updated DataWriter Session Keys through KeyRevisionInfo.

FIG. 2 Scalable propagation of updated DataWriter Session Keys through KeyRevisionInfo.

Figure 3:
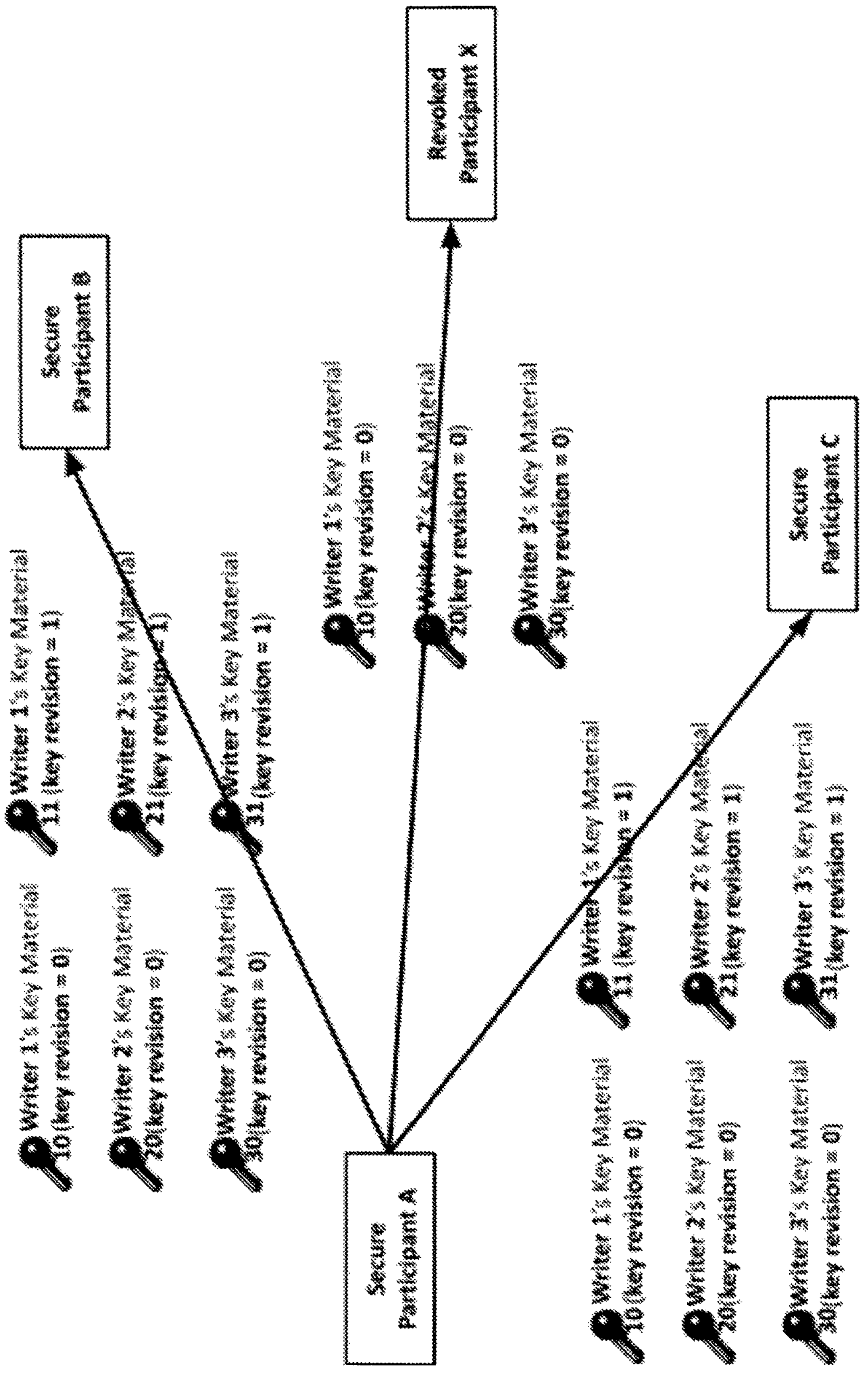
FIG. 3 shows according to an exemplary embodiment of the invention propagation of original and updated Data-Writer key material to N Participants to derive Session Keys.

FIG. 3 Propagation of original and updated DataWriter key material to N Participants to derive Session Keys.

Figure 4:
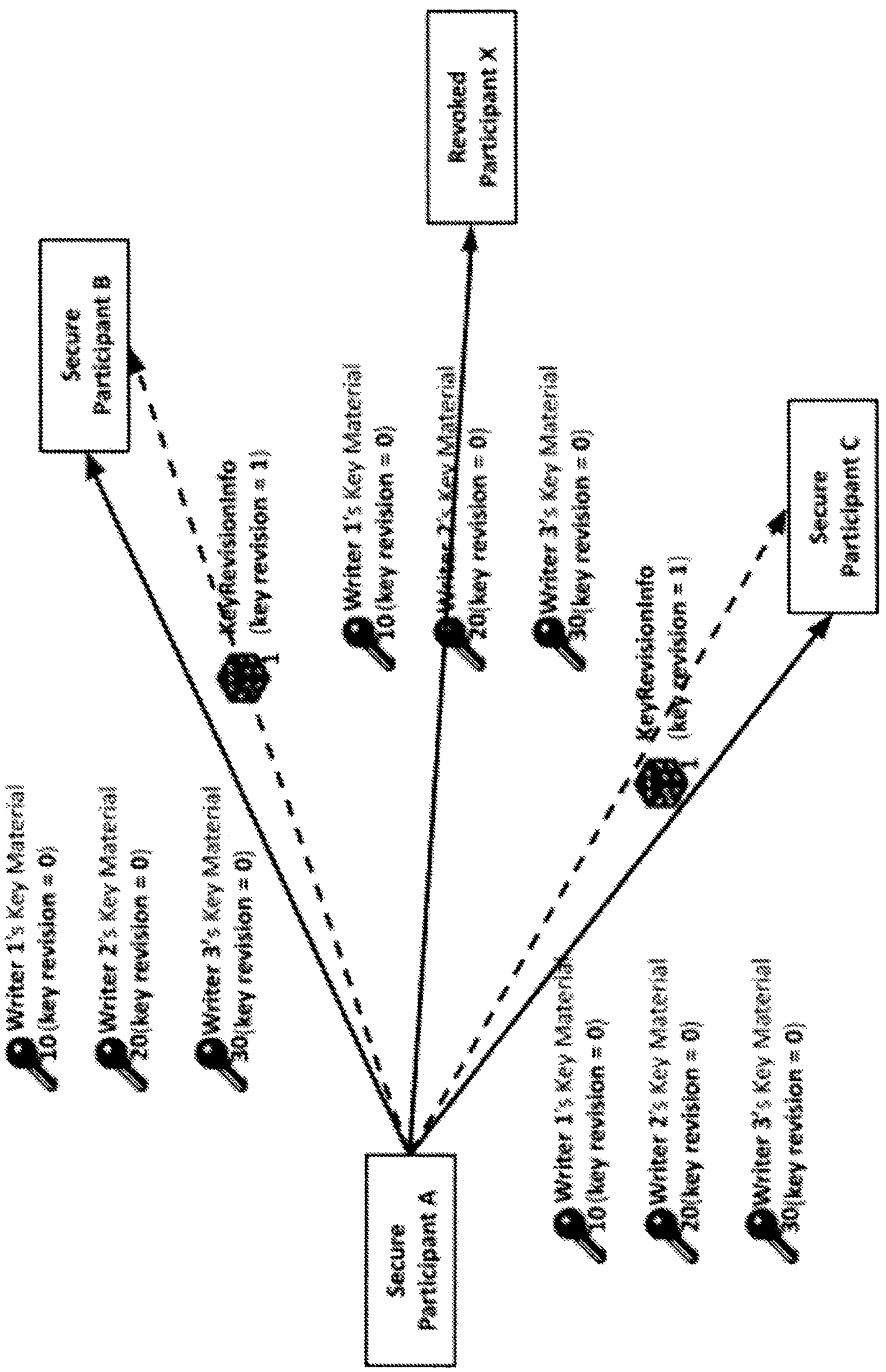
FIG. 4 shows according to an exemplary embodiment of the invention scalable propagation of updated DataWriter Session Keys through KeyRevisionInfo sent to N Participants.

FIG. 4 Scalable propagation of updated DataWriter Session Keys through KeyRevisionInfo sent to N Participants.

Entities

- Participant P1 contains keep-last 4 data-protected DataWriter W1
- Participant P2 contains DataReader R2
- Participant P3 contains DataReader R3
- KRW size and KRMHD are maximized in all three Participants.

Flow

1. P1 creates W1.
2. P2 creates R2.
3. W1 sends R2 3 samples: S0, S1, S2. (use no key revision, i.e. key_revision revisionId=0, which is an invalid key_revision_id)
4. P1 triggers key regeneration.
5. P1 calls create_local_key_revision (out: newRevisionId) to generate a new key_revision (the plugins notify P1 that the new key_revision is associated with newRevisionId=1). Current state in P1:
   a. P1.KRW=[0, 0] (P1 has not activated the latest revision yet).
   b. W1 history contains samples encoded with revisions within [0, 0] (W1 has not started using the new revision yet).
6. P1 calls create_local_key_revision tokens (1,1).
7. P1 sends the tokens to P2.
8. P2 calls set_remote_key_revision_tokens (P1, receivedTokens) to create the necessary local state for the new remote key_revision(s) (from each of the received key_revision_tokens). Current state in P2:
   a. P1.KRW=[0, 1] (from the point of P2, P1 can use revisionId=1 already).
9. P2 acknowledges to P1 key_revision_tokens have been received.
10. P1 calls activate_local_key_revision(newRevisionId=1) to start using the new key_revision (newRevisionId=1) across all crypto handles.
11. W1 sends R2 2 new samples: S3, S4. (uses key_revision revisionId=1).
12. P1 triggers key regeneration again, repeating steps 4-10. Latest key_revision revisionId=2).
13. W1 sends R2 1 new sample: S5. (uses key_revision revisionId=2).
14. Create P3, P3 creates R3.
15. P1 discovers P3 and completes authentication. Then:
    a. P1 asks the plugins for the current KRW by calling create_local_key_revision_tokens(0, UINT32_MAX). P1 will then send key revisions within the range [0, 2] (note revisionId=0 does not need a token) to P3.
       i. Note: active key revisions will be delivered prior to the original tokens. This way, the logic we have already in place to mark entities as "compatible" upon exchanging the crypto tokens will remain valid.
16. W1 matches with R3. W1 sends R3 its original, unrevised CryptoToken.
17. Since W1 still has S2, S3, S4, S5 in its queue, its history has samples using key_revisions within the range [0, 2], P1 needs to make sure P3 will have the necessary key_revisions. Then:
    a. P1 already sent the current KRW [0, 2] already (step 15.a), so no action needed.
18. P1 waits for P3 W1 original key and P1 most recent active key revision acknowledgment before marking R3 as fully matched with W1.
    a. This does not require additional changes to the current Connext DDS matching logic: We already (Hercules) wait for DataWriter original key delivery, and the acknowledgment of the DataWriter original key will only happen IF the latest key_revision (sent in step has been acknowledged too (keep in mind both DataWriter original key and latest key_revision are delivered through the secure volatile channel, which is a reliable, keep all channel, and the key_revision sample is written first).
    b. P1 will not wait for the rest of the active key_revisions (i.e., the key_revisions within the KRW that are not the latest). These are only needed for sending historical data, and they will not impact the rest of the DataWriter's communication (e.g. HBs).
19. P3 calls set_remote_key_revision_tokens (P1, receivedTokens) to configure the remote key_revision (from the received key_revision tokens) for the first time.
20. When R3 gets the samples from W1, it uses the key_revision_id in the CryptoHeader to locate the right key_revision for decoding the sample.

Purging Key Revisions Upon Reaching Key Revision Max. History Depth

When a Participant reaches KRMHD limits (this is, the maximum number of locally created key revisions), it needs to purge the oldest key_revision to make room for the new key_revision.

If the Participant contains data-protected DataWriters with samples in their queues, it will need to re-encode any sample that was encoded using the oldest key_revision. This is required because the key_revision is needed to re-encode the sample. Consequently, the Participant needs to make sure there are no encoded samples relying on the key_revision that is going to be destroyed.

Entities

Participant P1 contains keep-last DataWriters

Flow

1. P1 creates a new key revision and reaches the KRMHD limit.
2. For every data-protected DataWriter P1 owns, P1 checks if the DataWriter's oldest key_revision in use matches the key_revision to be purged.
3. For the DataWriters with a matching oldest key_revision, identify samples encoded with that key_revision (checking the crypto header) and re-encode the identified samples.
    a. To make this efficient, keep an inline list per DataWriter which has samples ordered by used key revision. Move samples to the end of the list as we (re)encode them.

Implementation Detailed Design

Lazily Reencoding a Historical Sample Because its Old Key Revision is Outside the Key Revision Window The KRW is a core property. It gets propagated to the security plugins by setting an internal property that gets read by the plugins: "dds.sec.dds.participant.trust_plugins.key_revision_window_size". This is the same approach as PROPERTY_NAME_DDS_PARTICIPANT_CDS_NAME.

The plugins use the KRW in order to know how many key revisions to keep per remote Participant.

In PRESWriterHistoryDriver requestData,

- We call me→_whPlugin→find_sample as usual. This gives us the entry, which has the serialized payload.
- We inspect the serialized payload to get the key revision ID.
- If the key revision ID is outside the KRW, then we call a DataWriter history function called re transform sample.
    - For memory, re transform sample just goes back to WHD, which will invoke the plugin re encode serialized data function.
    - For odbc, re_transform_sample goes back to WHD, which will invoke the plugin re_encode_serialized_data function. Then odbc will also copy the reencoded payload into ODBCSample, and then execute an "update sample payload" SQL statement.

Purging Key Revisions Upon Reaching Key Revision Max. History Depth

Motivation

If we don't cache key revisions at all, then we would have to iterate through the entire DataWriter history to check if samples need to be reencoded. This could be slow for ODBC. If the DataWriter history contains 1 sample with key revision 0 and 10000 samples with key revision 1, and we're purging key revision 0, then that's 10000 unnecessary iterations and fetches.

If we maintain an inline list of {key revision ID, sample} and cache a REDAInlineListNode in the metadata of every sample, then we would introduce 3 pointers of memory for every single sample, historical or not. In a real scenario, many of the live data samples may never get resent as repairs or historical data. We should not punish a large number of live data samples just to make reencoding a small number of historical data samples faster when it comes time to purge a key revision, which is not a common event.

A hybrid approach would he to have an inline list where each node has 1) revision ID, 2) lowest possible SN that was encoded with that revision ID, 3) highest possible SN that was encoded with that revision ID. This approach would consume less memory than the second approach and he faster than the first approach in most cases.

Hybrid Approach

In addition to KRMHD, we should also have a property key_revision_initial_history_depth.

When creating the Participant, we create a fast buffer pool_keyReyisionSnRangeBufferPool that is initialized and grown according to key_revision_initial_history_depth and key_revision_max_history_depth.

When creating the DataWriter, we create an InlineList of KeyRevisionSnRange nodes. Each node has RTI_UINT32 keyRevisionId struct REDASequenceNumber lowestPossibleSn struct REDASequenceNumber highestPossibleSn There would be an array of KeyRevisionSnRange inline lists that would live in PRESWriterHistoryDriver, one list per session.

In the beginning, this InlineList contains one node with keyRevisionId=0, lowestPossibleSn=0, highestPossibleSn=0.

When writing a sample, the highestPossibleSn of the last node gets incremented by 1.

When introducing a new key revision, a new node is added to the end of the list.

When re-encoding a sample in PRESWriterHistoryDriver_requestData (i.e., repairing a sample that was encoded with a revision outside the key revision window), if the sequence number of the sample is equal to the lowestPossibleSn or highestPossibleSn of the old revision's node, then increment the lowestPossibleSn or decrement the highestPossibleSn by 1.

When removing an old key revision,

- Iterate from the lowestPossibleSn to the highestPossibleSn of the corresponding node.
    - Call whd→_whPlugin→begin sample iteration(lowestPossibleSn).
    - Call next_sample.
    - Check the payload's keyRevisionId to see if it needs reencoding.
    - if it needs reencoding, then call re_encode.
        - In the case of odbc, also copy the reencoded payload into ODBCSample, and execute an "update sample payload" SQL statement.
    - If the sequence number is equal to highestPossibleSn, then call end_sample_iteration.
- Remove the node from the list.

Note that under this approach, having one low SN sample and one high SN sample that have not been sent in a while (e.g., because of content filtering) will force us to iterate through all of the samples between the two (as opposed to just 2 samples if using an ordered list of samples based on when reencoding happened). To make this efficient, we introduce the use of REDASequenceNumberIntervalList.

REDASEQUENCENUMBERINTERVALLIST

REDASequenceNumberIntervalList is a data structure representing a list of sequence number intervals. A sequence number interval is a set of consecutive sequence numbers that are grouped together based on a certain state (userData). Two consecutive intervals can be merged if there is no gap in sequence number between them and they share the same userData. The userData has an expiration time that indicates when it is not valid anymore. The userData expiration allows merging sequence number intervals with different userData that otherwise could never be merged.

Figure 5:
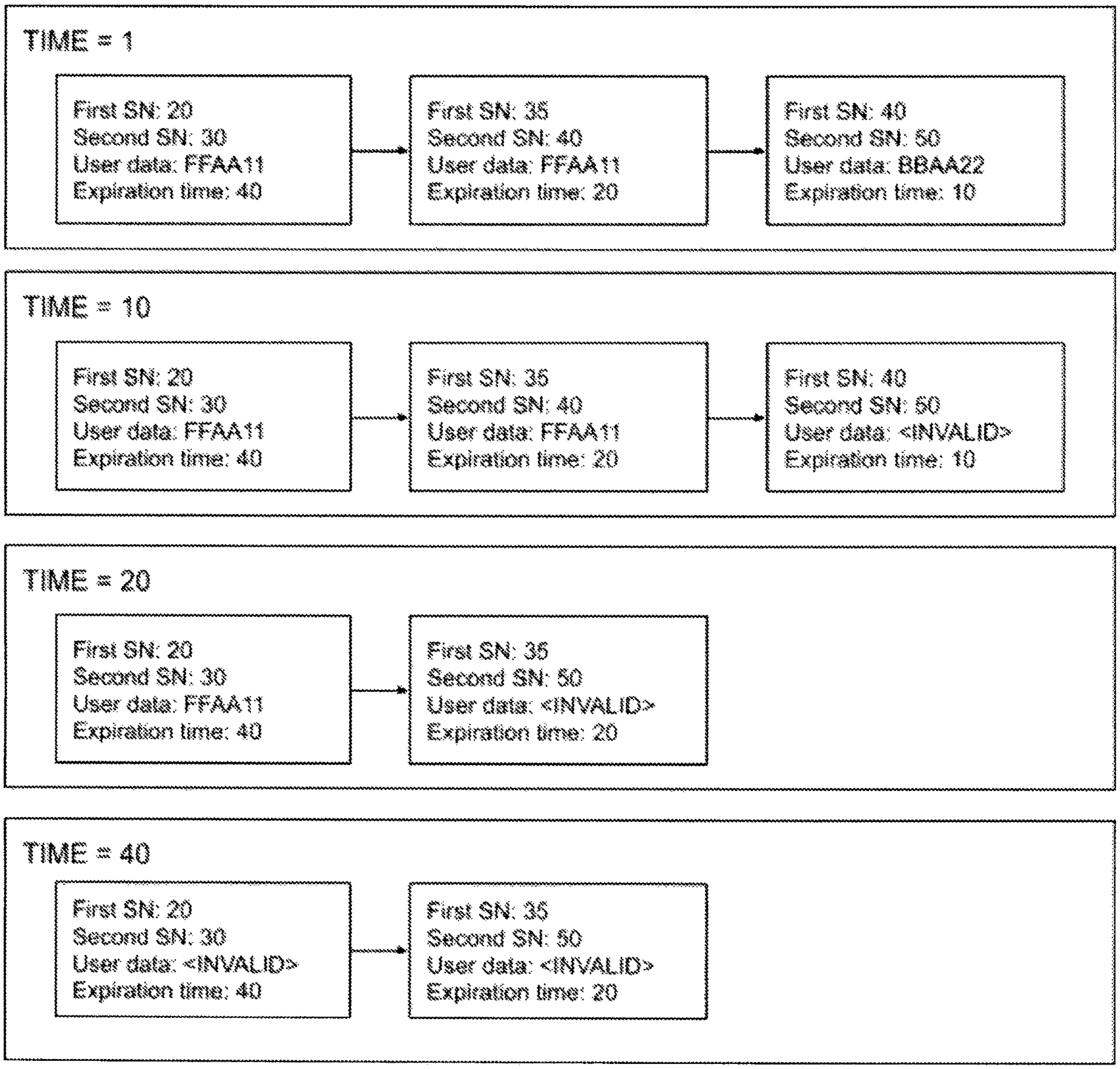
FIG. 5 shows according to an exemplary embodiment of the invention Sequence Number Interval Merging Based on UserData Expiration.

For example, in FIG. 5 we can see how the last two sequence number intervals are merged into a single sequence number interval once the userData for both sequence number intervals expires at time 20.

The REDASequenceNumberIntervalList also allows changing the userData and expiration time for an existing sequence number interval. Changing the userData may also lead to the merging of consecutive sequence number intervals if they shared the same userData after the change.

Figure 6:
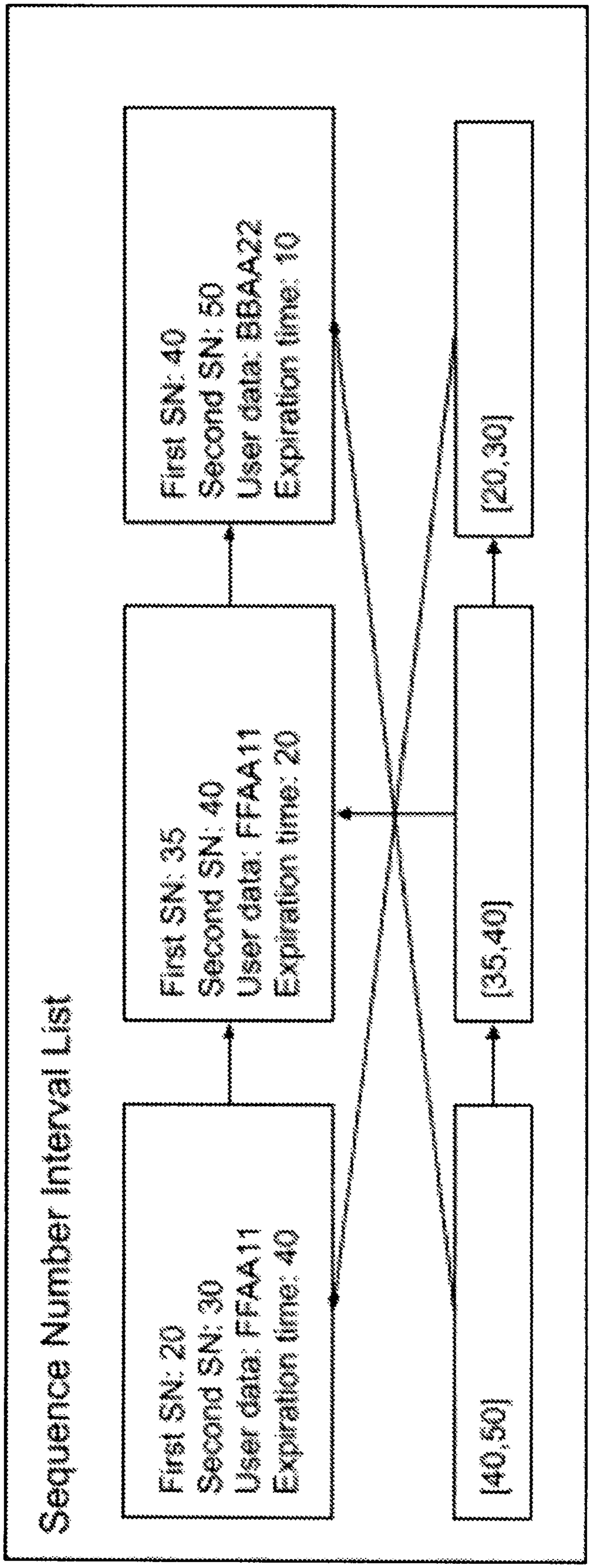
FIG. 6 shows according to an exemplary embodiment of the invention Sequence Number Interval Ordering.

The sequence number intervals in the REDASequenceNumberIntervalList are ordered based on two different criteria (see FIG. 6):

Sequence number value

Expiration time

The ordering per expiration time allows for fast lookup and invalidation of all of the intervals already expired.

Following there is a description of how the REDASequenceNumberIntervalList is used to facilitate fast re-encoding of samples with an old revisionId using a new revisionId.

To do that, this invention uses the revisionId as both userData and expiration time. Because the expiration time is the revisionId, finding all the samples with the old revisionId should have an algorithmic complexity O(1) which will speed up the re-encoding.

- When encoding a sample for the first time, we call REDASequenceNumberIntervalList_assertExplicitSequenceNumber WithUserData(sn, userData=revisionId, expirationTime=revisionId) to add the sample to a set of consecutive samples (an interval of sequence numbers) sharing the same revisionId.
- When reencoding a sample, we call REDASequenceNumberIntervalList_deleteSequenceNumber, then REDASequenceNumberIntervalList_assertExplicitSequenceNumber WithUserData(sn, userData=newRevisionId, expirationTime=newRevisionId) to remove the sample from the old set and add the sample to a set of consecutive samples sharing the same newRevisionId.
- When reencoding all the samples of a given revisionId,
- We call REDASequenceNumberIntervalList_getFirstExpiredInterval (oldRevisionId) to get the first interval of samples sharing the same oldRevisionId.
- We then re-encode the samples in the interval.
- We then update the expirationTime of the interval with the new revision ID.
- Then repeat until there are no more expired intervals.

Reencoding Instances

Problem: we need to store encoded instances in durable DataWriter history. We now need to solve the problem of reencoding the instances.

Key Idea:

Treat instances similarly to samples and only re-encode the instances encoded with a purged revision.

a. Problem: in order to avoid checking every single instance's revision to determine whether or not it needs to be reencoded, we need a REDASequenceNumberIntervalList for the instances. But the instance doesn't currently have a sequence number. So the instance needs another 8 bytes for the sequence number. So that's 8 more bytes of memory footprint per instance. So if there are a lot of instances, the memory footprint will be expensive.

b. What if we improve the memory footprint of the existing NDDS_WriterHistory_Instance?

i. We should definitely improve the order of the fields to avoid padding in between fields (i.e., improve the structure packing). I checked the sizes in gdb for a 64-bit Linux. sizeof(struct NDDS_WriterHistory_Instance)=136. The sum of the sizes of the individual fields=124. So there is room for improvement so we can avoid increasing the memory footprint per instance.

Workflow of Reencoding Instances

The PRESWriterHistoryDriver keeps a REDASequenceNumber nextInstanceSn. It starts off at 1. Whenever we initialize a new instance, we set the instance's SN to the DataWriter's _nextInstanceSn, and we increment _nextInstanceSn. Whenever we serialize a key in a dispose message, we use the instance's SN to populate the REDASequenceNumberIntervalList for samples.

Storing Key Revisions in Persistent Storage

Motivation: Although key revision information is common across DWs within the same Participant, there are two problems with storing key revision information in the Participant:

1) In SQLite, we only have DB files per DW, not per Participant. Adding files per Participant would be complicated.
2) Participants do not have the concept of virtual GUID. Therefore, the Participant table approach is not doable unless we add this concept. Naming the file using the Participant GUID does not work because this GUID has to be unique every time a Participant is started.

For these reasons, we will duplicate the key revision information across DWs. This should be fine because the information is not kept in memory.

For more information about how key_revision_tokens are used and their role please refer to Key regeneration and redistribution: new types and SPIs.

RESTORE=0 (CREATING DW FROM SCRATCH)

When a DW is created, add two new fields to the WH tables: key_revision_crypto_tokens and key_revision_crypto_tokens_length. This will contain encoded key revisions in the KRMHD.

If key_revision_crypto_tokens_length is −1, that means that the DataWriter's Participant is disabling key regeneration.

If key_revision_crypto_tokens_length is 0, that means that the DataWriter's Participant is enabling key regeneration, but no key revisions have been created.

This distinction is important because of 5.4.1.4 New CryptoTransformIdentifier_v2 structure. A Participant that's restoring the WH may not have the same enablement of key regeneration as the Participant that stored the WH (e.g., the storing Participant had KRW=0 while the restoring Participant has KRW=1). So we need a way to help the restoring Participant know how to interpret the CryptoHeaders, and we need to pass that information to the plugins.

When a new revision is created, encode the new key_revision_crypto_tokens using the same ParticipantQos "dds.data_writer.history.key_material_key", and for each local DW in the Participant, call a WH plugin function to update WH with the new encoded key_revision_crypto_tokens.

Restore=1 (Creating DW with State Restored from a Previous DW)

When a DW is created, check if key_revision_crypto_tokens_length is greater than 0. If it is, we need to decode the key_revision_crypto_tokens using "dds.data_writer.history.key_material_key"

reencode all of the samples that were encoded with a key revision. The reencoding will use the latest key revision of the new DomainParticipant. This way, the DomainParticipant won't have to send two sets of key revision CryptoTokens to a remote Participant: the revisions that it's currently using, and the revisions that it used in its previous lifetime.

Interaction with Batching

Today Connext Secure encodes each individual sample of a batch. Reencoding would be simplified if 1) we encode the entire batch, and 2) we flush as soon as we activate a new key revision (so that all samples in a batch have the same revision).

Encoding the entire batch also helps to support batching+compression+payload protection.

Public Interface Design

For functionality that requires user interaction, this section explains how the user will be able to use the functionality.

Configuration

This section describes the public configuration. For example, if a feature requires a new QoS, the QoS will be documented here. The design rationale for choosing a specific way to configure the functionality will be part of this section as well.

DDS.PARTICIPANT.TRUST_PLUGINS.MAX_KEY_REDISTRIBUTION_DELAY.SEC

This integer property is configurable in the core library. Per KR-R2-a, a new key revision won't take effect until one of these conditions is true:

all remote Participants have acknowledged receiving the new key revision a timeout occurs. This property configures this timeout.

If this timeout occurs, the remote Participants that have not yet acknowledged the new key revision will be completely removed. To be consistent with dds.participant.trust_plugins.authentication_timeout.sec, the default value is 60. The range is 1-RTI_INT32_MAX, or -1 for unlimited.

DDS.PARTICIPANT.TRUST_PLUGINS.KEY_REVISION_WINDOW_SIZE

This integer property is configurable in the core library. It controls the number of active key revisions that may be used for sending repair payloads. If the value is 0, then key redistribution is disabled.

DDS.PARTICIPANT.TRUST_PLUGINS.KEY_REVISION_MAX_HISTORY_DEPTH

This integer property is configurable in the core library. It controls the number of key revisions that are used to encode samples in the DataWriters' queues.

API Design

This section describes and documents the public APIs for the new functionality. The design rationale for the new API will be part of this section as well.

This section must include the design for the different languages that will be supported such as: C, Traditional C++, Modern C++, Java, .NET, Ada, Python, Lua, Javascript, etc.

EXTERNAL REFERENCES

See priority document for references on:

OMG DDS Security Specification 1.1,

OMG DDSI-RTPS Specification 2.5, and

RFC5869 (HMAC-based Extract-and-Expand Key Derivation Function (HKDF))

What is claimed is:

1. A method for performing secure distribution of symmetric keys in a publish-subscribe system, comprising:

(a) having a software system with a plurality of software applications, each of the software applications having a plurality of participants, wherein each of the plurality of participants is a software entity, and wherein each of the plurality of the participants contains one or more publishers and one or more subscribers;

(b) encoding and sending by one of the one or more publishers data samples to the one or more subscribers using a unique cryptographic software symmetric key for the one publisher, wherein the unique cryptographic software symmetric key is derived from a key material and a key revision, wherein the key material is a piece of cryptographic information unique for that one publisher, wherein the key revision is a piece of cryptographic information unique for the participant that contains that one publisher, and wherein the participant is capable of generating a plurality of key revisions;

(c) distributing by the participant that contains the one publisher the key material unique for the one publisher from step (b) to the participants containing the one or more subscribers;

(d) distributing by the participant that contains the one publisher the key revision from step (b) to the participants containing the one or more subscribers; and (e) each one of the participants containing the one or more subscribers deriving a new cryptographic symmetric key from the distributed unique key material from step (c) and the distributed key revision from step (d), wherein the new cryptographic symmetric key is equal to the unique cryptographic key for the one publisher from step (b).

* * * * *